United States Patent
Aratsu et al.

(10) Patent No.: US 8,806,642 B2
(45) Date of Patent: Aug. 12, 2014

(54) RESOURCE PROTECTION FROM UNAUTHORIZED ACCESS USING STATE TRANSITION HISTORIES

(75) Inventors: Taku Aratsu, Kanagawa (JP); Sanehiro Furuichi, Kanagawa (JP); Yasutaka Nishimura, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 13/338,054

(22) Filed: Dec. 27, 2011

(65) Prior Publication Data
US 2012/0167198 A1 Jun. 28, 2012

(30) Foreign Application Priority Data
Dec. 27, 2010 (JP) ................................. 2010-289876

(51) Int. Cl.
*G06F 11/00* (2006.01)
(52) U.S. Cl.
USPC .................... 726/24; 726/22; 726/23; 726/25
(58) Field of Classification Search
CPC ............. H04L 63/1416; H04L 63/145; H04L 63/1408; G06F 21/56
USPC ......................................... 726/22, 23, 24, 25
See application file for complete search history.

(56) References Cited

U.S. PATENT DOCUMENTS

| 7,086,086 | B2 * | 8/2006 | Ellis ............................... 726/15 |
| 7,716,240 | B2 * | 5/2010 | Lim ............................. 707/781 |
| 8,156,566 | B2 * | 4/2012 | Lim ................................ 726/30 |
| 2005/0086502 | A1 * | 4/2005 | Rayes et al. .................. 713/189 |
| 2007/0143851 | A1 * | 6/2007 | Nicodemus et al. ............ 726/25 |
| 2007/0275694 | A1 | 11/2007 | Aihara et al. |

FOREIGN PATENT DOCUMENTS

| JP | 2007280013 A | 10/2007 |
| JP | 4547861 B2 | 9/2010 |

* cited by examiner

*Primary Examiner* — Teshome Hailu
(74) *Attorney, Agent, or Firm* — Yee & Associates, P.C.; Jeffrey S. LaBaw

(57) ABSTRACT

A resource protection program, apparatus, and method for protecting resources to be processed on a computer. The resource protection program causes a computer to implement: a preparatory function as a function for preparing multiple defined state transition histories and multiple defined actions, both of which are associated with each other, wherein each of the defined state transition histories defines a state transition history of the computer upon execution of predetermined access to a predetermined resource, and each of the defined actions defined to be executable when a transition is made from a defined state to the next defined state; and an action execution function for selecting, upon execution of the real access to the real resource, a defined action associated with a marched defined state transition history from among one or more defined actions to execute die defined action selected.

26 Claims, 12 Drawing Sheets

RESOURCE PROTECTION FROM UNAUTHORIZED ACCESS USING STATE TRANSITION HISTORIES

BACKGROUND

1. Field

The present invention relates to a resource protection program, a resource protection apparatus, and a resource protection method for protecting resources to be processed on a computer. Particularly, the present invention relates to a resource protection program, a resource protection apparatus, and a resource protection method for protecting resources from unauthorized accesses such as from malware.

2. Description of the Related Art

There is a need to protect resources to be processed on a computer from unauthorized accesses such as from malware.

It is considered that restrictions are imposed on all operations such as copy to media without exception to ensure security. However, this could impair user convenience.

For example, even if copy to media is a necessary business process, information protection software often prohibit all copy operations without exception.

A context at the time of operating a computer can also be reflected to control accesses dynamically. However, there are many difficult points to identify and control access to a resource according to a history leading up to the operation or an external state of an application.

For example, confidential information can be protected using data or metadata in a file to be processed as information for making a decision. However, it is hard to control accesses flexibly based on a history of operations or the course of processes.

There has been no means for protecting, from unauthorized access, a resource as data existing in a memory of a computer before being saved to a file.

For example, it is anticipated that data in the memory is stolen by malware immediately before being saved to a file, but there has been no method of protecting data from such a fear.

The inventors have worked out a technique for referencing a history of state transitions leading up to the operation and multiple external states upon control of access to any resource to control the access to the resource based on a finite automaton extended to include multiple firing conditions dynamically varying according to the history of state transitions and the external states.

For example, even when transitions from an identical state to the next identical state are made, the transitions may go through different edges depending on the firing conditions. Therefore, the inventors have thought of reflecting each history of state transitions in a policy for controlling subsequent accesses.

For example, the inventors have thought of externally referencing a state in another system at the time as a firing condition for a state transition in addition to a simple event to reflect the reference result in the firing condition in order to execute an action different from firing condition to firing condition.

SUMMARY

The present invention has been made based on the above-mentioned ideas to provide a resource protection program, a resource protection apparatus, and a resource protection method for protecting resources to be processed on a computer.

In order to achieve the above object, according to the present invention, there is provided a resource protection program for protecting resources to be processed on a computer, the program causing the computer to implement: a preparatory function as a function for preparing multiple defined state transition histories and multiple defined actions, both of which are predefined and associated with each other, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to the next defined state, and a real state transition history is a history of actual state, transitions in the computer upon execution of real access as actual access to a real resource as an actual resource; a state transition function for making a transition of an actual state of the computer according to a defined state transition history; and an action execution function for selecting, upon execution of the real access to the real resource, a defined action associated with a defined state transition history when there is the defined state transition history matching the real state transition history from among one or more of the defined actions, each defined to be executable when the transition is made from a defined state matching a real state of the computer to the next defined state, to execute the defined action selected.

According to the above configuration of the present invention, the multiple defined states transition histories and the multiple defined actions, both of which are predefined and associated with each other, are prepared. Each of the defined state transition histories defines a state transition history as a history of state transitions in the computer upon execution of predetermined access to a predetermined resource. Each of the defined actions defines a process for controlling predetermined access to a predetermined resource so that the defined action can be executed upon transition from a defined state defining a state of the computer to the next defined state. The real state transition history is a history of actual state transitions in the computer upon execution of real access as actual access to a real resource as an actual resource. A transition of an actual state of the computer is made according to a defined state transition history. Upon execution of the real access to the real resource, a defined action associated with a defined state transition history when there is the defined state transition history matching the real state transition history is selected from among one or more of the defined actions, each defined to be executable when the transition is made from a defined state matching a real state of the computer to the next defined state, to execute the defined action selected.

As a result, an appropriate action can be executed according to the state transition history in the actual state of the computer to control the access to the resource properly.

The following will describe embodiments of the resource protection program according to the present invention. The present invention includes any one of the embodiments to be described below or modes in which two or more of the embodiments are combined.

The resource protection program according to one embodiment of the present invention is such that each of the defined state transition histories is one or more serial combinations of state/firing condition pairs as pairs, in each of which a defined state defining a state of the computer is associated with a defined firing condition defining a firing condition for making a transition from the defined state of the computer to the next defined state, the state transition function is a function for making a transition from a real state of the computer to the next defined state when the real state as an actual state of the computer matches the defined state and the defined firing condition associated with the matched defined state is satisfied, and the action execution function is a function for selecting, upon execution of the real access to the real resource, a defined action associated with a defined state transition history when there is the defined state transition history matching the real state transition history from among one or more of the defined actions, each defined to be executable when a transition is made from a defined stare matching the real state to the next defined state, on condition that the defined firing condition associated with the defined state matching the real state of the computer is satisfied, to execute the defined action selected.

According to the above process of the embodiment, each of the defined state transition histories is one or more serial combinations of state/firing condition pairs as pairs, in each of which a defined state defining a state of the computer is associated with a defined firing condition defining a firing condition for making a transition from the defined state of the computer to the next defined state. A transition is made from a real state of the computer to the next defined state when the real state as an actual state of the computer matches the defined state and the defined firing condition associated with the matched defined state is satisfied. Upon execution of the real access to the real resource, a defined action associated with a defined state transition history when there is the defined state transition history matching the real state transition history is selected from among one or more of defined actions, each defined to be executable when a transition is made from a defined state matching the real state to the next defined state, on condition that the defined firing condition associated with the defined state matching the real stare of the computer is satisfied, to execute the defined action selected.

As a result, an appropriate action can be executed according to the state transition history in the actual state of the computer to control the access to the resource properly.

The resource protection program according to another embodiment of the present invention is such that the preparatory function is a function for preparing one or more alternative defined actions predefined and associated, respectively, with the multiple defined state transition histories, wherein each of the alternative defined actions defines a process for controlling predetermined access to a predetermined resource so that the alternative defined action can be executed when a transition is made from a defined state of the computer to the next defined state, and upon execution of the real access to the real resource, when there is no defined state transition history matching the real stare transition history, the action execution function is a function for selecting an alternative defined action defined to be executable when the transition is made from the defined state matching the real state of the computer to the next defined state.

According to the above process of the embodiment, one or more alternative defined actions predefined and associated, respectively, with the multiple defined state transition histories are prepared. Each of the alternative defined actions defines a process for controlling predetermined access to a predetermined resource so that the alternative, defined action can be executed when a transition is made from a defined state of the computer to the next defined state. Upon execution of the real access to the real resource, when there is no defined state transition history matching the real state transition history, an alternative defined action defined to be executable when the transition is made from the defined state matching the real state of the computer to the next defined state is executed.

As a result, even when there is no supposed state transition history in the actual state of the computer, an appropriate action can be executed to control the access to the resource properly.

The resource protection program according to still another embodiment of the present invention is such that the preparatory function is a function for preparing multiple defined external states associated, respectively, with the multiple defined actions, wherein each of the defined external states defines an external state as another state that is not defined in the defined state transition histories of the computer, and a real external state is an actual external state as another state that is not defined in the defined state transition histories of the computer, and the action execution function is a function for selecting, upon execution of the real access to the real resource, a defined action associated with a defined external state when there is the defined external state matching the real external state from among one or more of the defined actions, each defined to be executable when a transition is made from a defined state matching a real state of the computer to the next defined state, to execute the defined action selected.

According to the above process of the embodiment, the multiple defined external states associated, respectively, with the multiple defined actions are prepared. Each of the defined external states defines an external state as another state that is not defined in the defined state transition histories of the computer. The real external state is an actual external state as another state that is not defined in the defined state transition histories of the computer. Upon execution of the real access to the real resource, a defined action associated with a defined external state when there is the defined external state matching the real external state is selected from among one or more of the defined actions, each defined to be executable when a transition is made from a defined state matching a real state of the computer to the next defined state, to execute die defined action selected.

As a result, an appropriate action can be executed according to the external state of the computer to control the access to the resource properly.

The resource protection program according to still another embodiment of the present invention is such that each of the defined state transition histories is one or more serial combinations of state/firing condition pairs as pairs, in each of which a defined state defining a state of die computer is associated with a defined firing condition defining a firing condition for making a transition from the defined state of the computer to the next defined state, the preparatory function is a function for associating the multiple defined firing conditions with the multiple defined external states, wherein each of the defined external states defines an external state as another state that is not defined in the defined state transition histories of the computer, and when a real state as an actual state of the computer matches a defined state, the state transition function is a function for making a transition from the real state of the computer to the next defined state on condition that a defined firing condition associated with the matched defined state and associated with a defined external state matching a real external state as an actual external state is satisfied.

According to the above process of the embodiment, each of the defined state transition histories is one or more serial combinations of state/firing condition pairs as pairs, in each of which a defined state defining a state of the computer is associated with a defined firing condition defining a firing condition for making a transition from the defined state of the computer to the next defined state. The multiple defined firing conditions are associated with the multiple defined external states, respectively. Each of the defined external states defines an external state as another state that is not defined in the defined state transition histories of the computer. When a real state as an actual state of the computer matches a defined state, the state transition function is a function for making a transition from the real state of the computer to the next defined state on condition that a defined firing condition associated with the matched defined state and associated with a defined external state matching a real external state as an actual external stare is satisfied.

As a result, the transition of the state of the computer can be dynamically made according to the external state to control the access to the resource properly.

The resource protection program according to yet another embodiment of the present invention is such that each of the defined state transition histories is one or more serial combinations of state/firing condition pairs as pairs, in each of which a defined state defining a state of the computer is associated with a defined firing condition defining a firing condition for making a transition from the defined state of the computer to the next defined state, the preparatory function is a function for associating the multiple defined firing conditions with the multiple defined state transition histories, and when a real state as an actual state of the computer matches a defined state, the state transition function is a function for making the transition from the real state of the computer to the next defined state on condition that a defined firing condition associated with the matched defined state and associated with a defined state transition history matching a real state transition history as an actual state transition history is satisfied.

According to the above process of the embodiment, each of the defined state transition histories is one or more serial combinations of state/firing condition pairs as pairs, in each of which a defined state defining a state of the computer is associated with a defined firing condition defining a firing condition for making a transition from the defined state of the computer to the next defined state. The multiple defined firing conditions are associated with the multiple defined state transition histories, respectively. When a real state as an actual state of the computer matches a defined state, the transition from the real state of the computer to the next defined state is made on condition that a defined firing condition associated with the matched defined state and associated with a defined state transition history matching a real state transition history as an actual state transition history is satisfied.

As a result, the transition of the state of the computer can be dynamically made according to the state transition history to control the access to the resource properly.

In order to achieve the above object, according to the present invention, there is provided a resource protection program causing a computer to implement: a preparatory function as a function for preparing multiple defined state transition histories and multiple defined actions, both of which are predefined and associated with each other, preparing multiple weighting values associated, respectively, with the multiple defined state transition histories, and associating multiple final state values with the multiple defined actions, respectively, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to the next defined state, each of the final state values is the value of a final state function using a weighting value as a variable, and a real state transition history is a history of actual state transitions in the computer upon execution of real access as actual access to a real resource as an actual resource; a state transition function for making a transition of an actual state of the computer according to a defined state transition history; a final state value calculating function as a function for calculating the final state function using a determined weighting value as a variable to obtain a final state value, wherein the determined weighting value is a weighting value associated with a defined state transition history matching the real state transition history; and an action execution function for selecting, upon execution of the real access to the real resource, a defined action associated with the final state value from among one or more of the defined actions, each defined to be executable when the transition is made from a defined state matching a real state of the computer to the next defined state, to execute the defined action selected.

According to the above configuration of the present invention, the multiple defined state transition histories and the multiple defined actions, both of which are predefined and associated with each other, are prepared. The multiple weighting values associated, respectively, with the multiple defined state transition histories are prepared. The multiple final state values are associated with the multiple defined actions, respectively. Each of the defined state transition histories defines a state transition history as a history of state transitions in the computer upon execution of predetermined access to a predetermined resource. Each of the defined actions defines a process for controlling predetermined access to a predetermined resource so that the defined action can be executed upon transition from a defined state defining a state of the computer to the next defined state. Each of the final state values is the value of the final state function using the weighting value as the variable. The real state transition history is a history of actual state transitions in the computer upon execution of real access as actual access to a real resource as an actual resource. A transition of an actual state of the computer is made according to a defined state transition history. The final state function is calculated using a determined weighting value as a variable to obtain the final state value. The determined weighting value is a weighting value associated with a defined state transition history matching the real state transition history. Upon execution of the real access to the real resource, a defined action associated with the final state value is selected from among one or more of the defined actions, each defined to be executable when the transition is made from a defined state matching a real state of the computer to the next defined state, to execute the defined action selected.

As a result, an appropriate action can be executed according to the state transition history in the actual state of the computer to control the access to the resource properly.

The following will describe embodiments of the resource protection program according to the present invention. The present invention includes any one of the embodiments to be described below or modes in which two or more of the embodiments are combined.

The resource protection program according to one embodiment of the present invention is such that the preparatory function is a function for preparing external state weighting values associated, respectively, with the multiple defined external states, and associating one or more defined state transitions in the computer with one or more of the defined external states, respectively, wherein each of the defined external states defines an external state as another state that is not defined in the defined state transition histories of the computer, and the final state value is the value of a final state function using the weighting value and the external state weighting values as variables, and the final state value calculating function is a function for calculating the final state function using a determined weighting value and determined external state weighting values as variables to obtain the final state value, wherein the determined weighting value is a weighting value associated with a defined state transition history matching the real state transition history, and the determined external state weighting values are external state weighting values associated with the defined external states associated with defined state transitions matching actual state transitions leading up to the real state of the computer.

According to the above process of the embodiment, the external state weighting values associated, respectively, with the multiple defined external states are prepared. One or more defined state transitions in the computer are associated with the one or more of the defined external states, respectively. Each of the defined external states defines an external state as another state that is not defined in the defined state transition histories of the computer. The final state value is the value of the final state function using the weighting value and the external state weighting values as the variables. The final state function is calculated using a determined weighting value and determined external state weighting values as variables to obtain the final state value. The determined weighting value is a weighting value associated with a defined state transition history matching the real state transition history. The determined external state weighting values are external state weighting values associated with the defined external states associated with defined state transitions matching actual state transitions leading up to the real state of the computer.

As a result, an appropriate action can be executed according to the state transition history in the actual state of the computer and the external state to control the access to the resource properly.

The resource protection program according to another embodiment of the present invention is such that each of the defined state transition histories is one or more serial combinations of state/firing condition pairs as pairs, in each of which a defined state defining a state of the computer is associated with a defined firing condition defining a firing condition for making a transition from the defined state of the computer to the next defined state, the state transition function is a function for making a transition from a real state of the computer to the next defined state when the real state as an actual state of the computer matches a defined state and the defined firing condition associated with the matched defined state is satisfied, and the action execution function is a function for selecting, upon execution of the real access to the real resource, a defined action associated with the final state value from among one or more of the defined actions, each defined to be executable when a transition is made from a defined state matching the real state to the next defined state, on condition that the defined firing condition associated with the defined state matching the real state of the computer is satisfied, to execute the defined action selected.

According to the above process of the embodiment each of the defined state transition histories is one or more serial combinations of state/firing condition pairs as pairs, in each of which a defined state defining a state of the computer is associated with a defined firing condition defining a firing condition for making a transition from the defined state of the computer to the next defined state. A transition is made from a real state of the computer to the next defined state when the real state as an actual state of the computer matches a defined state and the defined firing condition associated with the matched defined state is satisfied. Upon execution of the real access to the real resource, the action execution function is a function for selecting a defined action associated with the final state value from among one or more of the defined actions, each defined to be executable when a transition is made from a defined state matching the real state to the next defined state, on condition that the defined firing condition associated with the defined state matching the real state of the computer is satisfied, to execute the defined action selected.

As a result, an appropriate action can be executed according to the state transition history in the actual state of the computer to control the access to the resource properly.

The resource protection program according to still another embodiment of the present invention is such that each of the defined state transition histories is one or more serial combinations of state/firing condition pairs as pairs, in each of which a defined state defining a state of the computer is associated with a defined firing condition defining a firing condition for making a transition from the defined state of the computer to the next defined state, the preparatory function is a function for associating one or more of the state/firing condition pairs with one or more defined external states, wherein each of the determined external state weighting values is an external state weighting value associated with a defined external state associated with a state/firing condition pair as a pair of a defined state matching a real state of the computer and a defined firing condition matching a firing condition satisfied, the state transition function is a function for making a transition from a real state of the computer to the next defined state when the real state as an actual state of the computer matches a defined state and the defined firing condition associated with the matched defined state is satisfied, and the action execution function is a function for selecting, upon execution of the real access to the real resource, a defined action associated with the final state value from among one or more of the defined actions, each defined to be executable when a transition is made from a defined state matching the real state to the next defined state, on condition that the defined firing condition associated with the defined state matching the real state of the computer is satisfied, to execute the defined action selected.

According to the above process of the embodiment, each of the defined state transition histories is one or more serial combinations of state/firing condition pairs as pairs, in each of which a defined state defining a state of the computer is associated with a defined firing condition defining a firing condition for making a transition from the defined state of the computer to the next defined state. The one or more of the state/firing condition pairs are associated with one or more defined external states, respectively. Each of the determined external state weighting values is an external state weighting value associated with a defined external state associated with a state/firing condition pair as a pair of a defined state matching the real state of the computer and a defined firing condition matching a firing condition satisfied. A transition from the real state of the computer to the next defined state is made when the real state as an actual state of the computer matches a defined state and the defined firing condition associated with the matched defined state is satisfied. Upon execution of the real access to the real resource, a defined action associated with the final state value is selected from among one or more of the defined actions, each defined to be executable when a transition is made from a defined state matching the real state to the next defined state, on condition that the defined firing condition associated with the defined state matching the real state of the computer is satisfied, to execute the defined action selected.

As a result, an appropriate action can be executed according to the state transition history in the actual state of the computer to control the access to the resource properly.

The resource protection program according to still another embodiment of the present invention is such that the preparatory function is a function for preparing one or more alternative defined actions predefined and associated, respectively, with the multiple defined state transition histories, wherein each of the alternative defined actions defines a process for controlling predetermined access to a predetermined resource so that the alternative defined action can be executed when a transition is made from a defined state of the computer to the next state, and when there is no defined action associated with the final state value, the action execution function is a function for selecting, upon execution of the real access to the real resource, an alternative defined action defined to be executable when the transition is made from the defined state matching the real state of the computer to the next defined state.

According to the above process of the embodiment, the one or more alternative defined actions are predefined and associated with the multiple defined state transition histories. Each of the alternative defined actions defines a process for controlling predetermined access to a predetermined resource so that the alternative defined action can be executed when a transition is made from a defined state of the computer to the next state. Upon execution of the real access to the real resource, when there is no defined action associated with the final state value, an alternative defined action defined to be executable when the transition is made from the defined state matching the real state of the computer to the next defined state is executed.

As a result, even when there is no supposed state transition history in the actual state of the computer, an appropriate action can be executed to control the access to the resource properly.

The resource protection program according to yet another embodiment of the present invention is such that the preparatory function is a function for preparing multiple defined external states associated, respectively, with the multiple defined actions, wherein each of the defined external states defines an external state as another state that is not defined in the defined state transition histories of the computer, and a real external state is an actual external state as another state that is not defined in the defined state transition histories of the computer, and the action execution function is a function for selecting, upon execution of the real access to the real resource, a defined action associated with a defined external state when there is the defined external state matching the real external state from among one or more of the defined actions, each defined to be executable when a transition is made from a defined state matching a real state of the computer to the next defined state, to execute the defined action selected.

According to the above process of the embodiment, the multiple defined external states associated, respectively, with the multiple defined actions are prepared. Each of the defined external states defines an external state as another state that is not defined in the defined state transition histories of the computer. The real external state is an actual external state as another state that is not defined in the defined state transition histories of the computer. Upon execution of the real access to the real resource, a defined action associated with a defined external state when there is the defined external state matching the real external state is selected from among one or more of the defined actions, each defined to be executable when a transition is made from a defined state matching a real state of the computer to the next defined state, to execute the defined action selected.

As a result, an appropriate action can be executed according to the external state of the computer to control the access to the resource properly.

The resource protection program according to yet another embodiment of the present invention is such that each of the defined state transition histories is one or more serial combinations of state/firing condition pairs as pairs, in each of which a defined state defining a state of the computer is associated with a defined firing condition defining a firing condition for making a transition from the defined state of the computer to the next defined state, the preparatory function is a function for associating the multiple defined firing conditions with the multiple defined external states, respectively, wherein each of the defined external states defines an external state as another state that is not defined in the defined state transition histories of the computer, and when a real state as an actual state of the computer matches a defined state, the state transition function is a function for making a transition from the real state of the computer to the next defined state on condition that a defined firing condition associated with the matched defined state and associated with a defined external state matching a real external state as an actual external state is satisfied.

According to the above process of the embodiment, each of the defined state transition histories is one or more serial combinations of state/firing condition pairs as pairs, in each of which a defined state defining a state of the computer is associated with a defined firing condition defining a firing condition for making a transition from the defined state of the computer to the next defined state. The multiple defined firing conditions are associated with the multiple defined external states, respectively. Each of the defined external states defines an external state as another state that is not defined in the defined state transition histories of the computer. When a real state as an actual state of the computer matches a defined state, a transition is made from the real state of the computer to the next defined state on condition that a defined firing condition associated with the matched defined state and associated with a defined external state matching a real external state as an actual external state is satisfied.

As a result, the transition of the state of the computer can be dynamically made according to the external state to control the access to the resource properly.

The resource protection program according to yet another embodiment of the present invention is such that each of the defined state transition histories is one or more serial combinations of state/firing condition pairs as pairs, in each of which a defined state defining a state of the computer is associated with a defined firing condition defining a firing condition for making a transition from the defined state of the computer the next defined state, the preparatory function is a function for associating the multiple defined firing conditions with the multiple defined state transition histories, and when a real state as an actual state of the computer matches a defined state, the state transition function is a function for making the transition from the real state of the computer to the next defined state on condition that a defined firing condition associated with the matched defined state and associated with a defined state transition history when there is the defined state transition history matching a real state transition history as an actual state transition history is satisfied.

According to the above process of the embodiment, each of the defined state transition histories is one or more serial combinations of state/firing condition pairs as pairs, in each of which a defined state defining a state of the computer is associated with a defined firing condition defining a firing condition for making a transition from the defined state of the computer to the next defined state. The multiple defined firing conditions are associated with the multiple defined state transition histories, respectively. When a real state as an actual state of the computer matches a defined state, the transition from the real state of the computer to the next defined state is made on condition that a defined firing condition associated with the matched defined state and associated with a defined state transition history when there is the defined state transition history matching a real state transition history as an actual state transition history is satisfied.

As a result, the transition of the state of the computer can be dynamically made according to the defined state transition history to control the access to the resource properly.

In order to achieve the above object, according to the present invention, there is provided a resource protection program for protecting resources to be processed on a computer, the program causing the computer to implement: a preparatory function as a function for preparing multiple defined state transition histories and multiple defined actions, both of which are predefined and associated with each other, preparing multiple individual weighting values associated, respectively, with multiple defined state transitions in the computer, and associating multiple final state values with the multiple defined actions, respectively, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to the next defined state, each of the final state values is the value of a final state function using, as variables, multiple individual weighting values associated, respectively, with multiple defined state transitions matching multiple state transitions leading up to a predetermined state, and a real state transition history is a history of actual state transitions in the computer upon execution of real access as actual access to a real resource as an actual resource; a state transition function for making a transition of an actual state of the computer according to a defined state transition history; a final state value calculating function as a function for calculating the final state function using multiple determined individual weighting values as variables to obtain a final state value, wherein the multiple determined individual weighting values are multiple individual weighting values associated, respectively, with multiple defined state transitions matching multiple actual state transitions leading up to a real state of the computer upon execution of the real access to the real resource; and an action execution function for selecting, upon execution of the real access to the real resource, a defined action associated with the final state value from among one or more of the defined actions, each defined to be executable when the transition is made from a defined state matching the real state of the computer to the next defined state, to execute the defined action selected.

According to the above configuration of the present invention, the multiple defined state transitions and the multiple defined actions, both of which are predefined and associated with each other, are prepared. The multiple individual weighting values associated, respectively, with multiple defined state transitions in the computer are prepared. The multiple final state values are associated with the multiple defined actions, respectively. Each of the defined state transition histories defines a state transition history as a history of state transitions in the computer upon execution of predetermined access to a predetermined resource. Each of the defined actions defines a process for controlling predetermined access to a predetermined resource so that the defined action can be executed upon transition from a defined state, defining a state of the computer to the next defined state. Each of the final state values is the value of the final state function using, as the variables, the multiple individual weighting values associated, respectively, with multiple defined state transitions matching multiple state transitions leading up to a predetermined state. The real state transition history is a history of actual state transitions in the computer upon execution of real access as actual access to a real resource as an actual resource. A transition of an actual state of the computer is made according to a defined state transition history. The final state function is calculated using the multiple determined individual weighting value as the variables to obtain a final state value. The multiple determined individual weighting values are multiple individual weighting values associated, respectively, with multiple defined state transitions matching multiple actual state transitions leading up to a real state of the computer upon execution of the real access to the real resource. Upon execution of the real access to the real resource, a defined action associated with the final state value is selected from among one or more of the defined actions, each defined to be executable when the transition is made from a defined state matching the real state of the computer to the next defined state, to execute the defined action selected.

As a result, an appropriate action can be executed according to the state transition history in the actual state of the computer to control the access to the resource properly.

The following will describe embodiments of the resource protection program according to the present invention. The present invention includes any one of the embodiments to be described below or modes in which two or more of the embodiments are combined.

The resource protection program according to one embodiment of the present invention is such that the preparatory function is a function for preparing external state weighting values associated, respectively, with the multiple defined external states, and associating one or more defined state transitions in the computer with one or more defined external states, respectively, wherein each of the defined external states defines an external state as another state that is not defined in the defined state transition histories of the computer, and the final state value is the value of a final state function using, as variables, one or more determined individual weighting values and determined external state weighting values, and the final state value calculating function is a function for calculating the final state function using, as the variables, the one or more determined individual weighting values and the determined external state weighting values to obtain the final state value, wherein the multiple determined individual weighting values are multiple individual weighting values associated, respectively, with multiple defined state transitions matching multiple actual state transitions leading up to a real state of the computer upon execution of the real access to the real resource, and the determined external state weighting values are external state weighting values associated with the defined external states associated with defined state transitions matching actual state transitions leading up to the real state of the computer.

According to the above process of the embodiment, the external state weighting values associated, respectively, with the multiple defined external states are prepared. The one or more defined state transitions in the computer are associated with the one or more defined external states, respectively. Each of the defined external states defines an external state as another state that is not defined in the defined state transition histories of the computer. The final state, value is the value of the final state function using, as the variables, the one or more determined individual weighting values the determined external state weighting values. The final state function is calculated using the one or more determined individual weighting values and the determined external state weighting values as the variables to obtain the final state value. The multiple determined individual weighting values are multiple individual weighting values associated, respectively, with multiple defined state transitions matching multiple actual state transitions leading up to a real state of the computer upon execution of the real access to the real resource. The determined external state weighting values are external state weighting values associated with the defined external states associated with defined state transitions matching actual state transitions leading up to the real state of the computer.

As a result, an appropriate action can be executed according to the state transition history in the actual state of the computer to control the access to the resource properly.

The resource protection program according to another embodiment of the present invention is such that each of the defined state transition histories is one or more serial combinations of state/firing condition pairs as pairs, in each of which a defined state defining a state of the computer is associated with a defined firing condition defining a firing condition for making a transition from the defined state of the computer to the next defined state, the state transition function is a function for making a transition from a real state of the computer to the next defined state when the real state, as an actual state of the computer matches a defined state and the defined firing condition associated with the matched defined state is satisfied, and the action execution function selects, upon execution of the real access to the real resource, a defined action associated with the final state value from among one or more of the defined actions, each defined to be executable when a transition is made from a defined state matching the real state to the next defined, state, on condition that the defined firing condition associated with the defined state matching the real state of the computer is satisfied, to execute the defined action selected.

According to the above process of the embodiment, each of the defined state transition histories is one or more serial combinations of state/firing condition pairs as pairs, in each of which a defined state defining a state of the computer is associated with a defined firing condition defining a firing condition for making a transition from the defined state of the computer to the next defined state. A transition is made from a real state of the computer to the next defined state when the real state as an actual state of the computer matches a defined state and the defined firing condition associated with the matched defined state is satisfied. Upon execution of the real access to the real resource, a defined action associated with the final state value is selected from among one or more of the defined actions, each defined to be executable when a transition is made from a defined state matching the real state to the next defined state, on condition that the defined firing condition associated with the defined state matching the real state of the computer is satisfied, to execute the defined action selected.

As a result, an appropriate action can be executed according to the state transition history in the actual state of the computer to control the access to the resource properly.

The resource protection program according to still another embodiment of the present invention is such that each of the defined state transition histories is one or more serial combinations of state/firing condition pairs as pairs, in each of which a defined state defining a state of the computer is associated with a defined firing condition defining a firing condition for making a transition from the defined state of the computer to the next defined state, the preparatory function is a function for preparing multiple individual weighting values associated, respectively, with multiple state/firing condition pairs, and associating the one or more multiple state/firing condition pairs with one or more defined external states, respectively, wherein the final state value is the value of a final state function using, as variables, multiple individual weighting values associated, respectively, with multiple state/firing condition pairs of multiple defined states, respectively matching multiple states to which transitions leading up to a predetermined state are made, and multiple defined firing conditions satisfied, multiple determined individual weighting values are multiple individual weighting values associated, respectively, with multiple state/firing condition pairs of defined states, which match real states when transitions from real states to subsequent real states are made sequentially according to the transitions of the real states of the computer upon execution of real access to a real resource, and satisfied defined firing conditions, the state transition function is a function for making a transition from a real state of the computer to the next defined state when the real state as an actual state of the computer matches a defined state and the defined firing condition associated with the matched defined state is satisfied, and upon execution of the real access to the real resource, the action execution function selects a defined action associated with the final state value from among one or more of the defined actions, each defined to be executable when a transition is made from a defined state matching the real state to the next defined state, on condition that the defined firing condition associated with the defined state matching the real state of the computer is satisfied, to execute the defined action selected.

According to the above process of the embodiment, each of the defined state transition histories is one or more serial combinations of state/firing condition pairs as pairs, in each of which a defined state defining a state of the computer is associated with a defined firing condition defining a firing condition for making a transition from the defined state of the computer to the next defined state. The multiple individual weighting values associated, respectively, with multiple state/firing condition pairs are prepared. The one or more multiple state/firing condition pairs are associated with one or more defined external states, respectively, the final state value is the value of the final state function using, as the variables, the multiple individual weighting values associated, respectively, with the multiple state/firing condition pairs of multiple defined states, respectively matching multiple states to which transitions leading up to a predetermined state are made, and multiple defined firing conditions satisfied. The multiple determined individual weighting values are multiple individual weighting values associated, respectively, with the multiple state/firing condition pairs of defined states, which match real states when transitions from real states to subsequent real states are made sequentially according to the transitions of the real states of the computer upon execution of real access to a real resource, and satisfied defined firing conditions. A transition is made from a real state of the computer to the next defined state when the real state as an actual state of the computer matches a defined state and the defined firing condition associated with the matched defined state is satisfied. Upon execution of the real access to the real resource, a defined action associated with the final state value is selected from among one or more of the defined actions, each defined to be executable when a transition is made from a defined state matching the real state to the next defined state, on condition that the defined firing condition associated with the defined state matching the real state of the computer is satisfied, to execute the defined action selected.

As a result, an appropriate action can be executed according to the state transition history in the actual state of the computer to control the access to the resource properly.

The resource protection program according to still another embodiment of the present invention is such that the preparatory function is a function for preparing one or more alternative defined actions predefined and associated, respectively, with the multiple defined state transition histories, wherein each of the alternative defined actions defines a process for controlling predetermined access to a predetermined resource so that the alternative defined action can be executed when a transition is made from a defined state of the computer to the next state, and when there is no defined action associated with the final state value, the action execution function is a function for executing, upon execution of the real access to the real resource, an alternative defined action, defined to be executable when the transition is made from the defined state matching the real state of the computer to the next defined state.

According to the above process of the embodiment, one or more alternative defined actions predefined and associated, respectively, with the multiple defined state transition histories are prepared. Each of the alternative defined actions defines a process for controlling predetermined access to a predetermined resource so that the alternative defined action can be executed when a transition is made from a defined state of the computer to the next state. Upon execution of the real access to the real resource, when there is no defined action associated with the final state value, an alternative defined action defined to be executable when the transition is made from the defined state matching the real state of the computer to the next defined state is executed.

As a result, even when there is no supposed state transition history in the actual state of the computer, an appropriate action can be executed to control the access to the resource properly.

The resource protection program according to still another embodiment of the present invention is such that the preparatory function is a function for preparing multiple defined external states associated, respectively, with the multiple defined actions, wherein each of the defined external states defines an external state as another state that is nor defined in the defined state transition histories of the computer, and a real external state is an actual external state as another state that is not defined in the defined state transition histories of the computer, and the action execution function is a function for selecting, upon execution of the real access to the real resource, a defined action associated with a defined external state when there is the defined external state matching the real external state from among one or more of the defined actions, each defined to be executable when a transition is made from a defined state matching a real state of the computer to the next defined state, to execute the defined action selected.

According to the above process of the embodiment, the multiple defined external states associated, respectively, with the multiple defined actions are prepared. Each of the defined external states defines ah external state as another state that is not defined in the defined state transition histories of the computer. The real external state is an actual external state as another state that is not defined in the defined state transition histories of the computer. Upon execution of the real access to the real resource, a defined action associated with a defined external state when there is the defined external state matching the real external state is selected from among one or more of the defined actions, each defined to be executable when a transition is made from a defined state matching a real state of the computer to the next defined state, to execute the defined action selected.

As a result, an appropriate action can be executed according to the external state of the computer to control the access to the resource properly.

The resource protection program according to yet another embodiment of the present invention is such that each of the defined state transition histories is one or more serial combinations of state/firing condition pairs as pairs, in each of which a defined state defining a state of die computer is associated with a defined firing condition defining a firing condition for making a transition from the defined state of the computer to the next defined state, the preparatory function is a function for associating the multiple defined firing conditions with the multiple defined external states, wherein each of the defined external states defines an external state as another state that is not defined in the defined state transition histories of the computer, and when a real state as an actual state of the computer matches a defined state, the state transition function is a function for making a transition from the real state of the computer to the next defined state on condition that a defined firing condition associated with the matched defined state and associated with a defined external state matching a real external state as an actual external state is satisfied.

According to the above process of the embodiment, each of the defined stare transition histories is one or more serial combinations of state/firing condition pairs as pairs, in each of which a defined state defining a state of the computer is associated with a defined firing condition defining a firing condition for making a transition from the defined state of the computer to the next defined state. The multiple defined firing conditions are associated with the multiple defined external states/respectively. Each of the defined external states defines an external state as another state that is not defined in the defined state transition histories of the computer. When a real state as an actual state of the computer matches a defined state, a transition is made from the real state of the computer to the next defined state on condition that a defined firing condition associated with the matched defined state and associated with a defined external state matching a real external state as an actual external state is satisfied.

As a result, the transition of the state of the computer can be dynamically made according to the external state to control the access to the resource properly.

The resource protection program according to yet another embodiment of the present invention is such that each of the defined state transition histories is one or more serial combinations of state/Firing condition pairs as pairs, in each of which a defined state defining a state of the computer is associated with a defined firing condition defining a firing condition for making a transition from the defined state of the computer to the next defined state, the preparatory function is a function for associating the multiple defined firing conditions with the multiple defined state transition histories, respectively, and when a real state as an actual state of the computer matches a defined state, the state transition function makes the transition from the real state of the computer to the next defined state on condition that a defined firing condition associated with the matched defined state and associated with a defined state transition history when there is the defined state transition history matching a real state transition history as an actual state transition history is satisfied.

According to the above process of the embodiment, each of the defined state transition histories is one or more serial combinations of state/firing condition pairs as pairs, in each of which a defined state defining a state of the computer is associated with a defined firing condition defining a firing condition for making a transition from the defined state of the computer to the next defined state. The multiple defined firing conditions are associated with the multiple defined state transition histories, respectively. When a real state as an actual state of the computer matches a defined state, the transition is made from the real state of the computer to the next defined state on condition that a defined firing condition associated with the matched defined state and associated with a defined state transition history when there is the defined state transition history matching a real state transition history as an actual state transition history is satisfied.

As a result, the transition of the state of the computer can be dynamically made according to the defined state transition history to control the access to the resource properly.

In order to achieve the above object according to the present invention, there is provided a resource protection apparatus for protecting resources to be processed on a computer, the apparatus comprising: preparation means as means for preparing multiple defined state transition histories and multiple defined actions, both of which are predefined and associated with each other, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to the next defined state, and a real state transition history is a history of actual state transitions in the computer upon execution of real access as actual access to a real resource as an actual resource; state transition means for making a transition of an actual state of the computer according to a defined state transition history; and action execution means for selecting, upon execution of the real access to the real resource, a defined action associated with, a defined state transition history when there is the defined state transition history matching the real state transition history from among one or more of the defined actions, each defined to be executable when the transition is made from a defined state matching a real state of the computer to the next defined state, to execute the defined action selected.

According to the above configuration of the present invention, the multiple defined state transition histories and the multiple defined actions, both of which are predefined and associated with each other, are prepared. Each of the defined state transition histories defines a state transition history as a history of state transitions in the computer upon execution of predetermined access to a predetermined resource. Each of the defined actions defines a process for controlling predetermined access to a predetermined resource so that the defined action can be executed upon transition from a defined state defining a state of the computer to the next defined state. The real state transition history is a history of actual state transitions in the computer upon execution of real access as actual access to a real resource as an actual resource. A transition of an actual state of the computer is made according to a defined state transition history. Upon execution of the real access to the real resource, a defined action associated with a defined state transition history when there is the defined state transition history matching the real state transition history is selected from among one or more of the defined actions, each defined to be executable when the transition is made from a defined state matching a real state of the computer to the next defined state, to execute the defined action selected.

As a result, an appropriate action can be executed according to the state transition history in the actual state of the computer to control the access to the resource properly.

In order to achieve the above object, according to the present invention, there is provided a resource protection apparatus for protecting resources to be processed on a computer, the apparatus comprising: preparation means as means for preparing multiple defined state transition histories and multiple defined actions, both of which are predefined and associated with each other, preparing multiple weighting values associated, respectively, with the multiple defined state transition histories, and associating multiple final state values with the multiple defined actions, respectively, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to the next defined state, each of the final state values is the value of a final state function using a weighting value as a variable, and a real state transition history is a history of actual state transitions in the computer upon execution of real access as actual access to a real resource as an actual resource: state transition means for making a transition of an actual state of the computer according to a defined state transition history; final state value calculating means as means for calculating die final state function using a determined weighting value as a variable to obtain a final state value, wherein the determined weighting value is a weighting value associated with a defined state transition history matching the real state transition history; and action execution means for selecting, upon execution of the real access to the real resource, a defined action associated with the final state value from among one or more of the defined actions, each defined to be executable when the transition is made from a defined state matching a real state of the computer to the next defined state, to execute the defined action selected.

According to the above configuration of the present invention, the multiple defined state transition histories and the multiple defined actions, both of which are predefined and associated with each other, are prepared. The multiple weighting values associated, respectively, with the multiple defined state transition histories are prepared. The multiple final state values are associated with the multiple defined actions, respectively. Each of the defined state transition histories defines a state transition history as a history of state transitions in the computer upon execution of predetermined access to a predetermined resource. Each of the defined actions defines a process for controlling predetermined access to a predetermined resource so that the defined action can be executed upon transition from a defined state defining a state of the computer to the next defined state. Each of the final state values is the value of a final state function using a weighting value as a variable. The real state transition history is a history of actual state transitions in the computer upon execution of real access as actual access to a real resource as an actual resource. A transition of an actual state of the computer is made according to a defined state transition history. The final state function is calculated using the determined weighting value as the variable to obtain a final state value.

The determined weighting value is a weighting value associated with a defined state transition history matching the real state transition history. Upon execution of the real access to the real resource, a defined action associated with the final state value is selected from among one or more of the defined actions, each defined to be executable when the transition is made from a defined state matching a real state of the computer to the next defined state, to execute the defined action selected.

As a result, an appropriate action can be executed according to the state transition history in the actual state of the computer to control the access to the resource properly.

In order to achieve the above object, according to the present invention, there is provided a resource protection apparatus for protecting resources to be processed on a computer, the apparatus comprising: preparation means as means for preparing multiple defined state transition histories and multiple defined actions, both of which are predefined and associated with each other, preparing multiple individual weighting values associated, respectively, with multiple defined state transitions in the computer, and associating multiple final state values with the multiple defined actions, respectively, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to the next defined state, each of the final state values is the value of a final state function using, as variables, multiple individual weighting values associated with multiple defined state transitions matching multiple state transitions leading up to a predetermined state, and a real state transition history is a history of actual state transitions in the computer upon execution of real access as actual access to a real resource as an actual resource; state transition means for making a transition of an actual state of the computer according to a defined state transition history; final state value calculating means as means for calculating the final state function using multiple determined individual weighting values as variables to obtain a final state value, wherein the multiple determined individual weighting values are multiple individual weighting values associated, respectively, with multiple defined state, transitions matching multiple actual state transitions leading up to a real state of the computer upon execution of the real access to the real resource; and action execution means for selecting, upon execution of the real access to the real resource, a defined action associated with the final state value from among one or more of the defined actions, each defined to be executable when the transition is made from a defined state matching the real state of the computer to the next defined state, to execute the defined action selected.

According to the above configuration of the present invention, the multiple defined state transition histories and the multiple defined actions, both of which are predefined and associated with each other, are prepared. The multiple individual weighting values associated, respectively, with multiple defined state transitions in the computer are prepared. The multiple final state values are associated with the multiple defined actions, respectively. Each of the defined state transition histories defines a state transition history as a history of state transitions in the computer upon execution of predetermined access to a predetermined resource. Each of the defined actions defines a process for controlling predetermined access to a predetermined resource so that the defined action can be executed upon transition from a defined state defining a state of the computer to the next defined state. Each of the final state values is the value of the final state function using, as the variables, the multiple individual weighting values associated with multiple defined state transitions matching multiple state transitions leading up to a predetermined state. The real state transition history is a history of actual state transitions in the computer upon execution of real access as actual access to a real resource as an actual resource. A transition of an actual state of the computer is made according to a defined state transition history. The final state function is calculated using the multiple determined individual weighting values as the variables to obtain a final state value. The multiple determined individual weighting values are multiple individual weighting values associated, respectively, with multiple defined state transitions matching multiple actual state transitions leading up to a real state of the computer upon execution of the real access to the real resource. Upon execution of the real access to the real resource, a defined action associated with the final state value is selected from among one or more of the defined actions, each defined to be executable when the transition is made from a defined state matching the real state of the computer to the next defined state, to execute the defined action selected.

As a result, an appropriate action can be executed according to the state transition history in the actual state of the computer to control the access to the resource properly.

In order to achieve the above object, according to the present invention, there is provided a resource protection method for protecting resources to be processed on a computer, the method comprising: a preparation step as a step of preparing multiple defined state transition histories and multiple defined actions, both of which are predefined and associated with each other, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to the next defined state, and a real state transition history is a history of actual state transitions in the computer upon execution of real access as actual access to a real resource as an actual resource; a state transition step of making a transition of an actual state of the computer according to a defined state transition history; and an action execution step of selecting, upon execution of the real access to the real resource, a defined action associated with a defined state transition history when there is the defined state transition history matching the real state transition history from among one or more of the defined actions, each defined to be executable when the transition is made from a defined state matching a real state of the computer to the next defined state, to execute the defined action selected.

According to the above configuration of the present invention, the multiple defined state transition histories and the multiple defined actions, both of which are predefined and associated with each other, are prepared. Each of the defined state transition histories defines a state transition history as a history of state transitions in the computer upon execution of predetermined access to a predetermined resource. Each of the defined actions defines a process for controlling predetermined access to a predetermined resource so that the defined action can be executed upon transition from a defined state defining a state of the computer to the next defined state. The real state transition history is a history of actual state transitions in the computer upon execution of real access as actual access to a real resource as an actual resource. A transition of an actual state of the computer is made according to a defined state transition history. Upon execution of the real access to the real resource, a defined action associated with a defined state transition history when there is the defined state transition history matching the real state transition history is selected from among one or more of the defined actions, each defined to be executable when the transition is made from a defined state matching a real state of the computer to the next defined state, to execute the defined action selected.

As a result, an appropriate action can be executed according to the state transition history in the actual state of the computer to control the access to the resource properly.

In order to achieve the above object, according to the present invention, there is provided a resource protection method for protecting resources to be processed on a computer, the method comprising: a preparation step as a step of preparing multiple defined state transition histories and multiple defined actions, both of which are predefined and associated with each other, preparing multiple weighting values associated, respectively, with the multiple defined state transition histories, and associating multiple final state values with the multiple defined actions, respectively, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to the next defined state, each of the final state values is the value of a final state function using a weighting value as a variable, and a real state transition history is a history of actual state transitions in the computer upon execution of real access as actual access to a real resource as an actual resource; a state transition step of making a transition of an actual state of the computer according to a defined state transition history; a final state value calculating step as a step of calculating the final state function using a determined weighting value as a variable to obtain a final state value, wherein the determined weighting value is a weighting value associated with a defined state transition history matching the real state transition history; and an action execution step of selecting, upon execution of the real access to the real resource, a defined action associated with the final state value from among one or more of the defined actions, each defined to be executable when the transition is made from a defined state matching a real state, of the computer to the next defined stare, to execute the defined action selected.

According to the above configuration of the present invention, the multiple defined state transition histories and the multiple defined actions, both of which are predefined and associated with each other, are prepared. The multiple weighting values associated, respectively, with the multiple defined state transition histories are prepared. The multiple final state values are associated with the multiple defined actions, respectively. Each of the defined state transition histories defines a state transition history as a history of state transitions in the computer upon execution of predetermined access to a predetermined resource. Each of the defined actions defines a process for controlling predetermined access to a predetermined resource so that the defined action can be executed upon transition from a defined state defining a state of the computer to the next defined state. Each of the final state values is the value of a final state function using a weighting value as a variable. The real state transition history is a history of actual state transitions in the computer upon execution of real access as actual access to a real resource as an actual resource. A transition of an actual state of the computer is made according to a defined state transition history. The final state function is calculated using the determined weighting value as the variable to obtain a final state value. The determined weighting value is a weighting value associated with a defined state transition history matching the real state transition history. Upon execution of the real access to the real resource, a defined action associated with the final state value is selected from among one or more of the defined actions, each defined to be executable when the transition is made from a defined state matching a real state of the computer to the next defined state, to execute the defined action selected.

As a result, an appropriate action can be executed according to the state transition history in the actual state of the computer to control the access to the resource properly.

In order to achieve the above object, according to the present invention, there is provided a preparation step as a step of preparing multiple defined state transition histories and multiple defined actions, both of which are predefined and associated with each other, preparing multiple individual weighting values associated, respectively, with multiple defined state transitions in the computer, and associating multiple final state values with the multiple defined actions, respectively, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to the next defined state, each of the final state values is the value of a final state function using, as variables, multiple individual weighting values associated with multiple defined state transitions matching multiple state transitions leading up to a predetermined state, and a real state transition history is a history of actual stare transitions in the computer upon execution of real access as actual access to a real resource as an actual resource; a state transition step of making a transition of an actual state of the computer according to a defined state transition history; a final state value calculating step as a step of calculating the final state function using multiple determined individual weighting values as variables to obtain a final state value, wherein the multiple determined individual weighting values are multiple individual weighting values associated, respectively, with multiple defined state transitions matching multiple actual state transitions leading up to a real state of the computer upon execution of the real access to the real resource; and an action execution step of selecting, upon execution of the real access to the real resource, a defined action associated with the final state value from among one or more of the defined actions, each defined to be executable when the transition is made from a defined state matching the real state of the computer to the next defined state, to execute the defined action selected.

According to the above configuration of the present invention, the multiple defined state transition histories and the multiple defined actions, both of which are predefined and associated with each other, are prepared. The multiple individual weighting values associated, respectively, with multiple defined state transitions in the computer are prepared. The multiple final state values are associated with the multiple defined actions, respectively. Each of the defined state transition histories defines a state transition history as a history of state transitions in the computer upon execution of predetermined access to a predetermined resource. Each of the defined actions defines a process for controlling predetermined access to a predetermined resource so that the defined action can be executed upon transition from a defined state defining a state of the computer to the next defined state. Each of the final state values is the value of the final state function using, as the variables, the multiple individual weighting values associated with multiple defined state transitions matching multiple state transitions leading up to a predetermined state. The real state transition history is a history of actual state transitions in the computer upon execution of real access as actual access to a real resource as an actual resource. A transition of an actual state of the computer is made according to a defined state transition history. The final state function is calculated using the multiple determined individual weighting values as the variables to obtain a final state value. The multiple determined individual weighting values are multiple individual weighting values associated, respectively, with multiple defined state transitions matching multiple actual state transitions leading up to a real state of the computer upon execution of the real access to the real resource. Upon execution of the real access to the real resource, a defined action associated with the final state value is selected from among one or more of the defined actions, each defined to be executable when the transition is made from a defined state matching the real state of the computer to the next defined state, to execute the defined action selected.

As a result, an appropriate action can be executed according to the state transition history in the actual state of the computer to control the access to the resource properly.

As described above, the configurations of the resource protection program, the resource protection apparatus, and the resource protection method according to the present invention have the following advantages.

A transition of a state of a computer is made according to a defined state transition history in which the state of the computer is predefined, and upon execution of real access to a real resource, a defined action associated with an actual state transition history is selected and executed from among multiple defined actions each defined to be executable when a transition from an actual state is made. Thus, an appropriate action can be executed according to the state transition history in the actual state of the computer to control the access to the resource properly.

Also, a state transition history of the computer is defined by one or more combinations of pairs of defined states and defined firing conditions to make a transition of a state when a firing condition is satisfied, and upon execution of real access to a real resource, a defined action associated with an actual state transition history is selected and executed from among multiple defined actions, each defined to be executable when a transition from an actual state is made, on condition that a firing condition associated with the state is satisfied. Thus, an appropriate action can be executed according to the state transition history in the actual state of the computer to control the access to the resource properly.

Further, an alternative defined action is defined separately, and upon execution of real access to a real resource, the alternative defined action is executed when the suite transition history is not that in the actual state. Thus, even when there is no supposed state transition history in the actual state of the computer, an appropriate action can be executed to control the access to the resource properly.

Further, an external state as another state that is not defined in the defined state transition history is associated with a defined action, and upon execution of real access to a real resource, the defined action associated with the external state is selected and executed from among multiple defined actions each defined to be executable when a transition from an actual state is made. Thus, an appropriate action can be executed according to the external state of the computer to control the access to the resource properly.

Further, the state transition history of the computer is defined by one or more combinations of pairs of defined states and defined firing conditions, an external state as another state that is nor defined in the defined state transition history is associated with a firing condition, and upon execution of real access to a real resource, a transition from a state of the computer to the next state is made on condition that the firing condition associated with the external state is satisfied. Thus, the transition of the state of the computer can be dynamically made according to the external state to control the access to the resource properly.

Further, the state transition history of the computer is defined by one or more combinations of pairs of defined states and defined firing conditions, the defined state transition history is associated with a firing condition, and upon execution of real access to a real resource, a transition from a state of the computer to the next state is made on condition that the firing condition associated with the state transition history is satisfied. Thus, the transition of the state of the computer can be dynamically made according to the state transition history to control the access to the resource properly.

A transition of a state of a computer is made according to a defined state transition history in which the state of the computer is predefined, a final state value is calculated based on a weighting value associated with a state transition history, and upon execution of real access to a real resource, a defined action associated with the final state value is selected and executed from among multiple defined actions, each defined to be executable when a transition from an actual state is made. Thus, an appropriate action can be executed according to the state transition history in the actual state of the computer to control the access to the resource properly.

Also, an external state as another state that is not defied in the defined state transition history is associated with an external state weighting value, a transition of a state of the computer is made according to the defined state transition history in which the state of the computer is predefined, a final state value is calculated based on a weighting value associated with a state transition history and the external state weighting value, and upon execution of real access to a real resource, a defined action associated with the final state value is selected and executed from among multiple defined actions, each defined to be executable when a transition is made from an actual state. Thus, an appropriate action can be executed according to the state transition history in the actual state of the computer and the external state to control the access to the resource properly.

Further, a state transition history of the computer is defined by one or more combinations of pairs of defined states and defined firing conditions to make a transition of a state when a firing condition is satisfied, and upon execution of real access to a real resource, a defined action associated with a final state value is selected and executed from among multiple defined actions, each defined to be executable when a transition from an actual state is made, on condition that a firing condition associated with die state is satisfied. Thus, an appropriate action can be executed according to the state transition history in the actual state of the computer to control the access to the resource properly.

Further, an alternative defined action is defined separately, and upon execution of real access to a real resource, the alternative defined action is executed when there is no defined action associated with the final state value. Thus, even when there is no supposed state transition history in the actual state of the computer, an appropriate action can be executed to control the access to the resource properly.

Further, an external state as another state that is not defined in the defined stare transition history is associated with a defined action, and upon execution of real access to a real resource, the defined action associated with the external state is selected and executed from among multiple defined actions each defined to be executable when a transition from an actual state is made. Thus, an appropriate action can be executed according to the external state of the computer to control the access to the resource properly.

Further, the state transition history of the computer is defined by one or more combinations of pairs of defined states and defined firing conditions, an external state as another state that is not defined in the defined state transition history is associated with a firing condition, and upon execution of real access to a real resource, a transition from a state of the computer to the next state is made on condition that the firing condition associated with the external state is satisfied. Thus, the transition of the state of the computer can be dynamically made according to the external state to control the access to the resource properly.

Further, the state transition history of the computer is defined by one or more combinations of pairs of defined states and defined firing conditions, the defined state transition history is associated with a firing condition, and upon execution of real access to a real resource, a transition from a state of the computer to the next state is made on condition that the firing condition associated with the state transition history is satisfied. Thus, the transition of the state of the computer can be dynamically made according to the state transition history to control the access to the resource properly.

A transition of a state of a computer is made according to a defined state transition history in which the state of the computer is predefined, a final state value is calculated based on individual weighting values associated, respectively, with multiple state transitions, and upon execution of real access to a real resource, a defined action associated with the final state value is selected and executed from among multiple defined actions, each defined to be executable when a transition from an actual state is made. Thus, an appropriate action can be executed according to the state transition history in the actual state of the computer to control the access to the resource properly.

Also, an external state as another state that is not defied in the defined state transition history is associated with an external state weighting value, a transition of a state of the computer is made according to the defined state transition history in which the state of the computer is predefined, a final state value is calculated based on a weighting value associated with state transitions and the external state weighting value, and upon execution of real access to a real resource, a defined action associated with the final state value is selected and executed from among multiple defined actions, each defined to be executable when a transition is made from an actual state. Thus, an appropriate action can be executed according to the state transition history in the actual state of the computer and the external state to control the access to the resource properly.

Further, the state transition history of the computer is defined by one or more combinations of pairs of defined states and defined firing conditions to make a transition of a state when a firing condition is satisfied, and upon execution of real access to a real resource, a defined action associated with a final state value is selected and executed from among multiple defined actions, each defined to be executable when a transition from an actual state is made, on condition that the firing condition associated with the state is satisfied. Thus, an appropriate action can be executed according to the state transition history in the actual state of the computer to control the access to the resource properly.

Further, an alternative defined action is defined separately, and upon execution of real access to a real resource, the alternative defined action is executed when there is no defined action associated with the final state value. Thus, even when there is no supposed state transition history in the actual state of the computer, an appropriate action can be executed to control the access to the resource properly.

Further, an external state as another state that is not defined in the defined state transition history is associated with a defined action, and upon execution of real access to a real resource, the defined action associated with the external state is selected and executed from among multiple defined actions each defined to be executable when a transition from an actual state is made. Thus, an appropriate action can be executed according to the external state of the computer to control the access to the resource properly.

Further, the state transition history of the computer is defined by one or more combinations of pairs of defined states and defined firing conditions, an external state as another state that is not defined in the defined state transition history is associated with a firing condition, and upon execution of real access to a real resource, a transition from a state of the computer to the next state is made on condition that the firing condition associated with the external state is satisfied. Thus, the transition of the state of the computer can be dynamically made according to the external state to control the access to the resource properly.

Further, the state transition history of the computer is defined by one or more combinations of pairs of defined states and defined firing conditions, the defined state transition history is associated with a firing condition, and upon execution of real access to a real resource, a transition from a state of the computer to the next state is made on condition that the firing condition associated with the state transition history is satisfied. Thus, the transition of the state of the computer can be dynamically made according to the state transition history to control the access to the resource properly.

Thus, a resource protection program for protecting resources to be processed on a computer can be provided.

DETAILED DESCRIPTION

Modes for carrying out the present invention will now be described with reference to the accompanying drawings.

First, a resource protection program according to one preferred embodiment of the present invention will be described with reference to the accompanying drawings.

Figure 1:
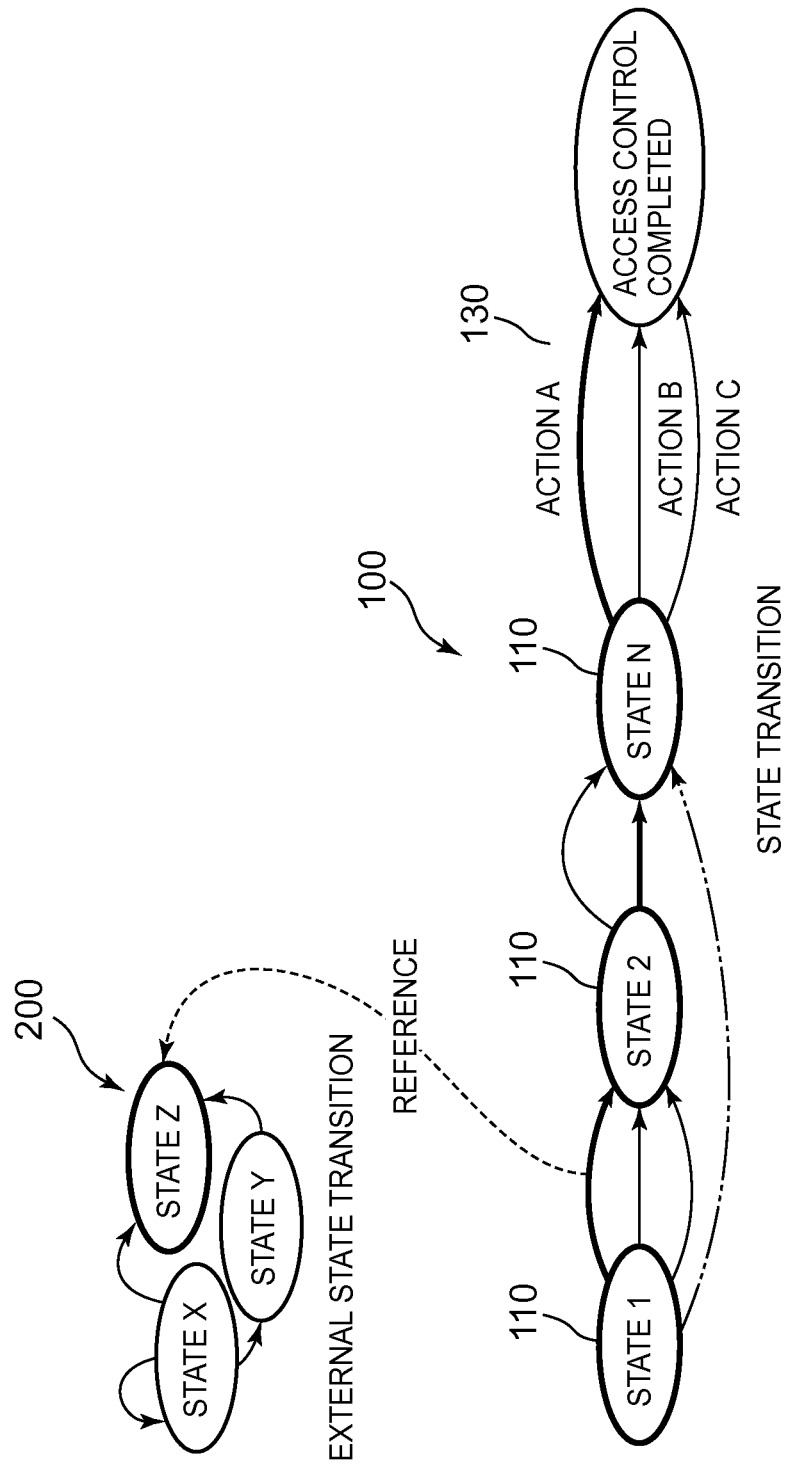
FIG. 1 is a conceptual diagram of a resource protection program according to one preferred embodiment of the present invention.
Figure 2:
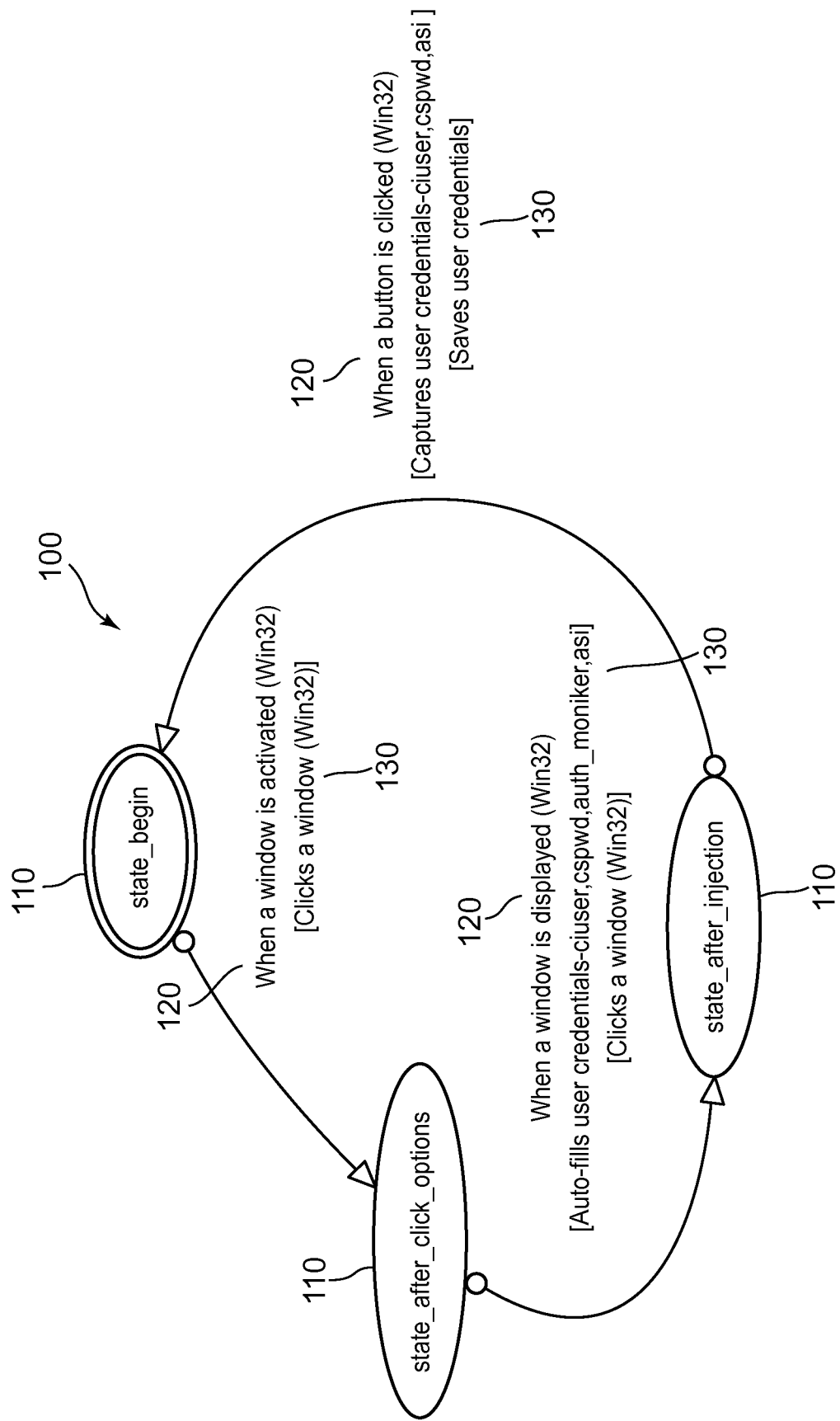
FIG. 2 is a conceptual diagram of a defined state transition history according to the embodiment of the present invention.

FIG. 1 is a conceptual diagram of the resource protection program according to the embodiment of the present invention. FIG. 2 is a conceptual diagram of a defined state transition history according to the embodiment of the present invention.

The resource protection program according to the embodiment of the present invention causes a computer to implement various functions.

Figure 12:
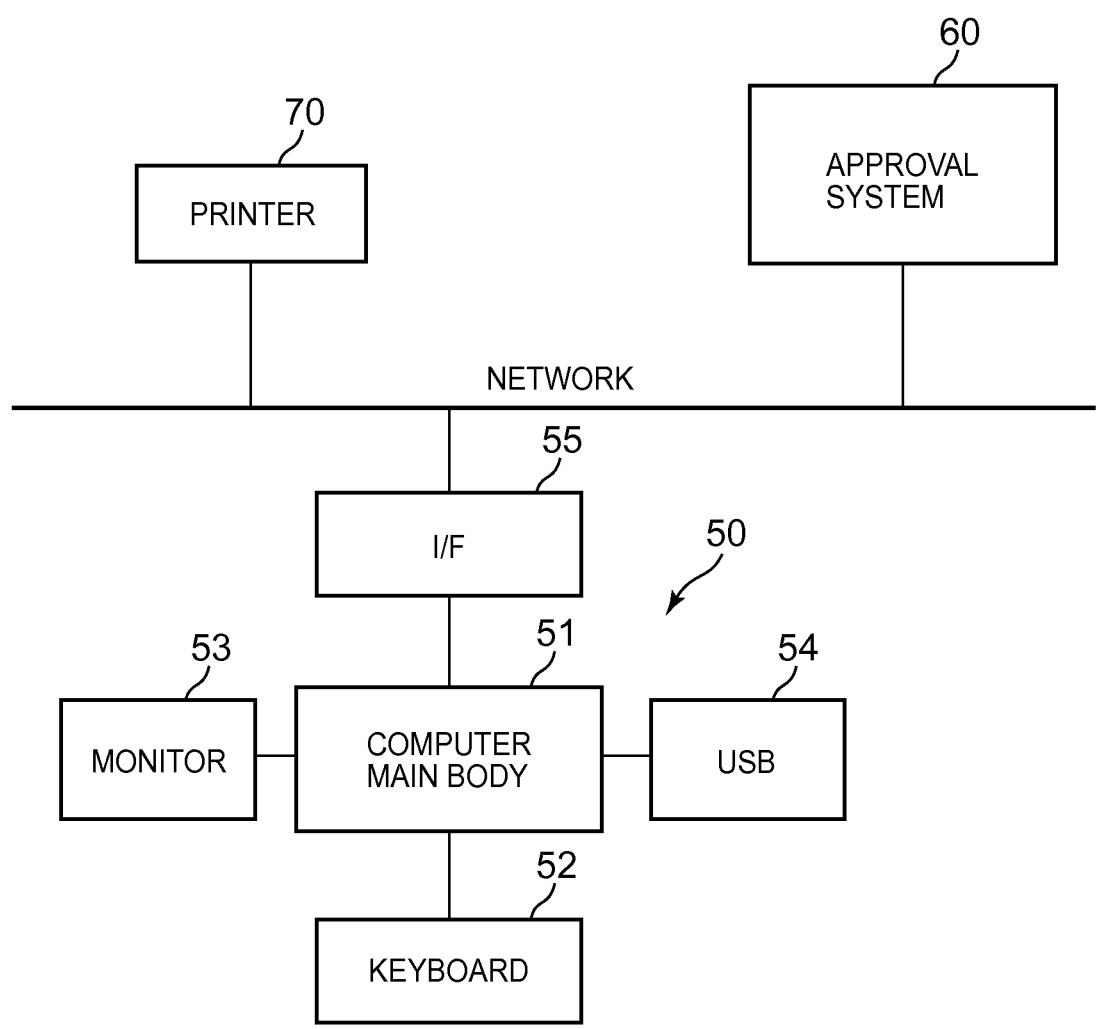
FIG. 12 is a system diagram of a computer according to the embodiment of the present invention.

The following will describe a computer 50 with reference to FIG. 12.

The computer 50 is configured to include a computer main body 51, a keyboard 62, a monitor 53, an external memory 54, and an interface 55.

The computer main body 51 is configured to include a CPU, a memory, and the like.

The keyboard 62 sends the computer main body 51 code keyed in by an operator.

The monitor 53 displays characters and images based on data sent from the computer main body 51.

The external memory 54 is a portable storage device removable from the computer main body 51. For example, the external memory 54 is a USB memory.

The interface 55 is a device for connecting the computer main body 51 to external devices or systems. The interface 55 is, for example, a network interface.

The computer 50 is connected to a network 56.

The computer 50 records, in the storage device, various kinds of information necessary to fulfill the functions to be described later.

An approval system 60, a printer 70, and the like are connected to the network 56.

The approval system 60 is a system designed to aid in approving a report, a project proposal, a contract document, or the like.

The resource protection program according to the embodiment of the present invention causes the computer 50 to implement a preparatory function, a state transition function, and an action execution function.

The preparatory function is a function for preparing multiple defined state transition histories 100 and multiple defined actions 130, both of which are predefined and associated with each other.

Here, each of the defined state transition histories 100 defines a stare transition history as a history of state transitions in the computer upon execution of predetermined access to a predetermined resource.

Each of the defined actions 130 defines a process for controlling predetermined access to a predetermined resource so that the defined action can be executed upon transition from a defined state 110 of the computer to the next defined state 110.

A real state transition history is a history of actual state transitions in the computer upon execution of real access to a real resource. The real resource is an actual resource. The real access is actual access.

The defined state transition history 100 may include one or more serial combinations of state/firing condition pairs as pairs in each of which a defined state 110 defining a state of the computer is associated with a defined firing condition 120 defining a firing condition for making a transition from the defined state 110 of the computer to the next defined state 110.

FIG. 2 shows a simple, specific example of the defined state transition history 100 defined by one or more serial combinations of state/firing condition pairs.

For the sake of clarity, this specific example will be described.

The defined state transition history 100 is represented by serial combinations of defined state/firing condition pairs, namely a defined state/firing condition pair of a defined state (state_begin) and a defined firing condition (When a window is activated (Win32)), a defined state/firing condition pair of a defined state (state_after_click_options) and a defined firing condition (When a window is displayed (Win32)), and a defined state/firing condition pair of a defined state (state_after_injection) and a defined firing condition (When a button is clicked (Win32)).

A defined action [clicks a window (Win32)] is associated with the defined state transition history 100 leading to the defined state (state_begin).

Defined actions [Auto-fills user credentials-ciuser.cspwd, auth_moniker, asi] and [Clicks a window (Win32)] are associated with the defined state transition history 100 leading to the defined state (state_after_click_options).

Defined actions [Captures user credentials-ciuser.cspwd.asi] and [Saves credentials] are associated with the defined state transition history 100 leading to the defined state (state_after_injection).

The following will describe how to make a transition of the actual state of the computer according to the defined state transition history 100.

When the real state is a defined state (start state), if a login screen becomes active, the real state is forced to go into a state of clicking on an options menu.

When the real state is a defined state (a state after clicking on an option), if an authentication window appears, the user will be forced to enter an ID and a password into an authentication form.

When the real state is a defined state (state_after_injection), if an OK button is clicked, user information will be stored.

The preparatory function may also prepare, one or more alternative defined actions 130 predefined and associated with the multiple defined state transition histories 100, respectively.

Here, each of the alternative defined actions defines a process for controlling predetermined access to a predetermined resource so that the alternative defined action can be executed upon transition from a defined state 110 of the computer to the next defined state 110.

Further, the preparatory function may prepare multiple defined external states associated with multiple defined actions 130, respectively.

Here, each of the defined external states defines an external state as another state that is not defined in the defined state transition histories 100 of the computer. A real external state is an actual external state as the other state that is not defined in the defined state transition histories 100 of the computer.

A transition of each of the defined external states may be made according to a defined external condition history 200.

The state transition function is a function for making a transition of an actual state of the computer according to the defined state transition history 100.

The state transition function may make a transition from a real state of the computer to the next defined state 110 when the real state as the actual state of the computer matches the defined state 110 and a defined firing condition 120 associated with the matched defined state 110 is satisfied.

Upon execution of real access to a real resource, the action execution function serves as a function for selecting a defined action 130 associated with a defined state transition history 100 when there is the defined state transition history 100 matching the real state transition history from among one or more defined actions 130, each defined to be executable when a transition is made from a defined state 110 matching the real state of the computer to the next defined state 110, to execute the defined action 130 selected.

Further, upon execution of real access to a real resource, the action execution function serves as a function for selecting a defined action 130 associated with a defined state transition history 100 when there is the defined state transition history 100 matching a real state transition history leading up to the real state from among one or more defined actions 130, each defined to be executable when a transition is made from a defined state 110 matching the real state of the computer to the next defined state 110, to execute the defined action 130 selected.

Upon execution of real access to a real resource, the action execution function may select a defined action 130 associated with a defined state transition history 100 when there is the defined state transition history 100 matching the real state transition history from among one or more defined actions 130, each defined to be executable when a transition is made from a defined stare 110 matching the real state of the computer to the next defined state 110, on condition that a defined firing condition 120 associated with the defined state 110 matching the real state of the computer is satisfied to execute the defined action 130 selected.

Further, upon execution of real access to a real resource, the action execution function may select a defined action 130 associated with a defined state transition history 100 when there is the defined state transition history 100 matching a real state transition history leading up to the real state from among one or more defined actions 130, each defined to be executable when a transition is made from a defined state 110 matching the real state of the computer to the next defined state 110, on condition that a defined firing condition 120 associated with the defined state 110 matching the real state of the computer is satisfied.

Upon execution of real access to a real resource, if there is no defined state transition history 100 matching the real state transition history, the action execution function may execute an alternative defined action defined to be executable when a transition is made from a defined state 110 matching the real state of the computer to the next defined state 110.

Upon execution of real access to a real resource, the action execution function may select a defined action 130 associated with a defined external state when there is the defined external state matching the real external state from among one or more defined actions 130, each defined to be executable when a transition is made from a defined state 110 matching the real state of the computer to the next defined state 110, to execute the defined action 130 selected.

Further, upon execution of real access to a real resource, the action execution function may select a defined action 130 associated with a defined state transition history 100 when there is the defined state transition history 100 matching die real state transition history and associated with a defined external state when there is the defined external state matching the real external state from among one or more defined actions 130, each defined to be executable when a transition is made from a defined state 110 matching the real state of the computer to the next defined state 110, to execute the defined action 130 selected.

Further, upon execution of real access to a real resource, the action execution function may select a defined action 130 associated with a defined state transition history 100 when there is the defined state transition history 100 matching a real state transition history leading up to the real state and associated with a defined external state when there is the defined external state matching the real external state from among one or more defined actions 130, each defined to be executable when a transition is made from a defined state 110 matching the real state of the computer to the next defined state 110, to execute the defined action 130 selected.

Next, a resource protection program according to a first embodiment of the present invention will be described based on the following drawings.

Figure 3:
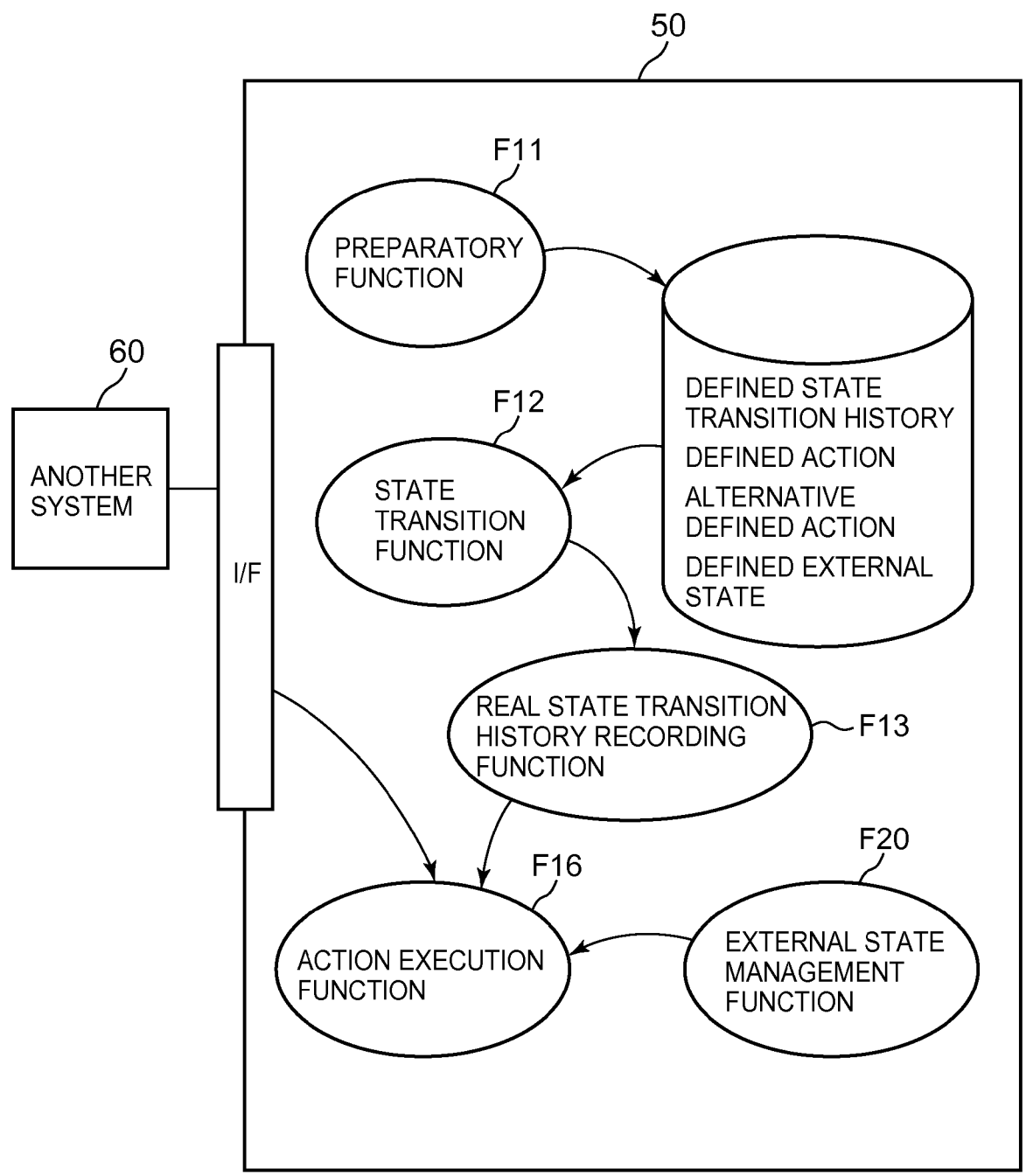
FIG. 3 is a functional block diagram of a resource protection program according to a first embodiment of the present invention.
Figure 4:
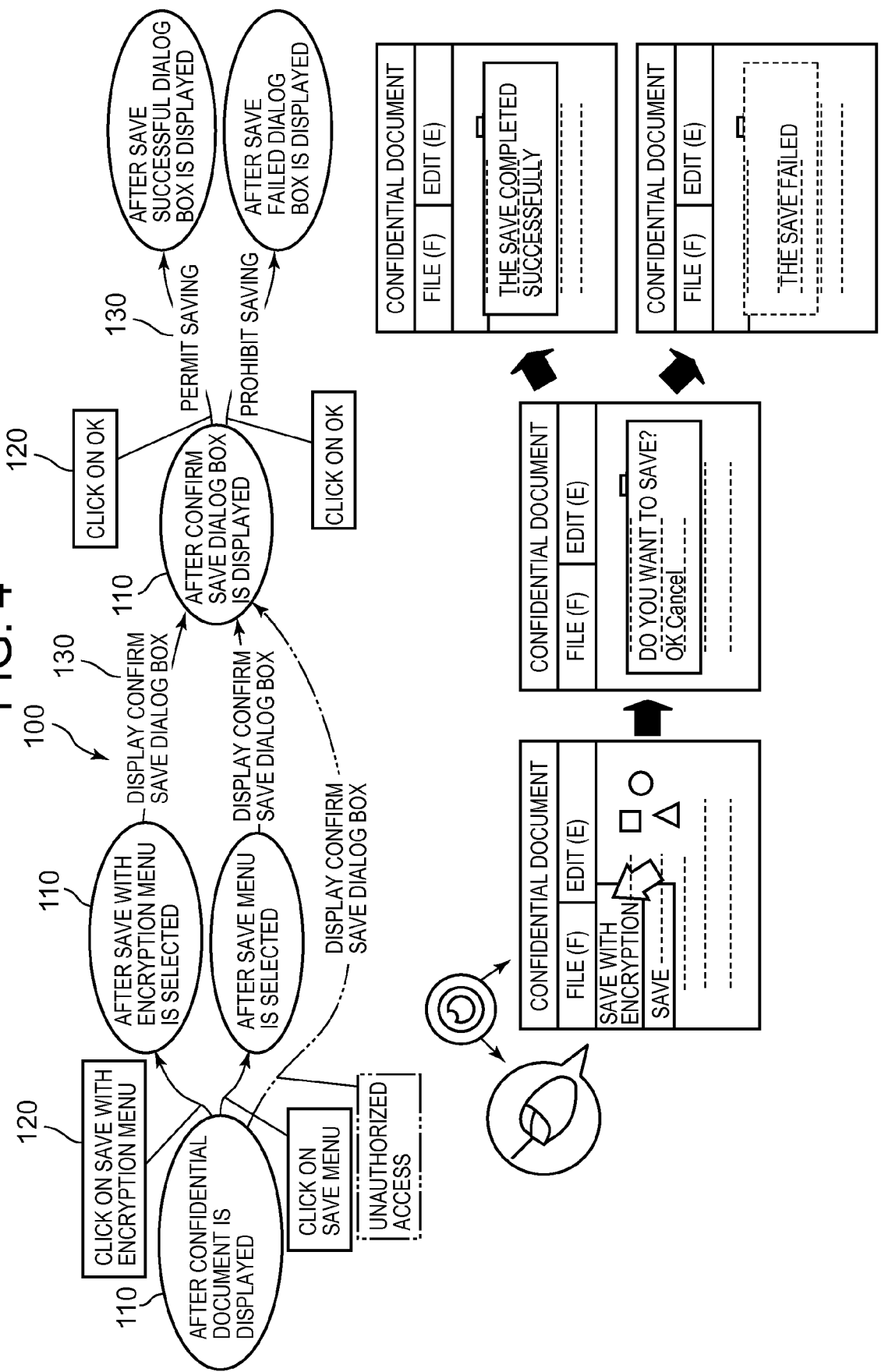
FIG. 4 is a first conceptual diagram of the resource protection program according to the first embodiment of the present invention.
Figure 5:
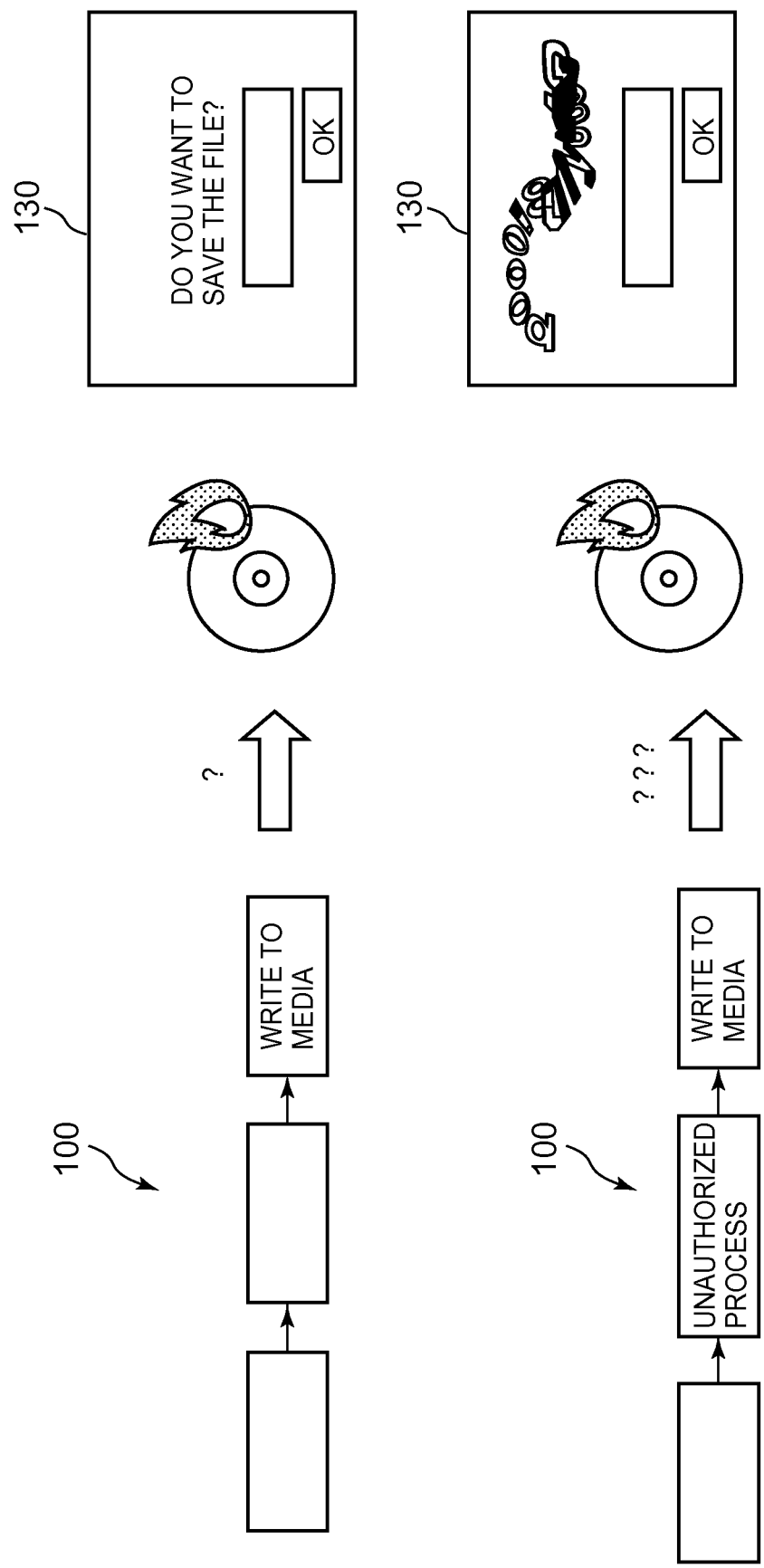
FIG. 5 is a second conceptual diagram of the resource protection program according to the first embodiment of the present invention.

FIG. 3 is a functional block diagram of the resource protection program according to the first embodiment of the present invention. FIG. 4 is a first conceptual diagram of the resource protection program according to the first embodiment of the present invention. FIG. 5 is a second conceptual diagram of the resource protection program according to the first embodiment of the present invention.

The resource protection program according to the first embodiment of the present invention causes the computer to implement a preparatory function F11, a state transition function F12, and an action execution function F16.

The resource protection program according to the first embodiment of the present invention may cause the computer to implement the preparatory function F11, the state transition function F12, a real state transition history recording function F13, and the action execution function F16.

Further, the resource, protection program according to the first embodiment of the present invention may cause the computer to implement the preparatory function F11, the state transition function F12, the real state transition history recording function F13, the action execution function F16, and an external state management function F20.

The preparatory function F11 is a function for preparing multiple defined state transition histories 100 and multiple defined actions 130, both of which are predefined and associated with each other.

Here, each of the defined state transition histories 100 defines a state transition history as a history of state transitions in the computer upon execution of predetermined access to a predetermined resource.

Each of the defined actions 130 defines a process for controlling predetermined access to a predetermined resource so that the defined action can be executed upon transition from a defined state 110 defining a state of the computer to the next defined state 110.

A real state transition history is a history of actual state transitions in the computer upon execution of real access to a real resource. The real resource is an actual resource. The real access is actual access.

The defined state transition history 100 may include one or more serial combinations of state/firing condition pairs as pairs in each of which a defined state 110 defining a state of the computer is associated with a defined firing condition 120 defining a firing condition for making a transition from the defined state 110 of the computer to the next defined state 110.

The preparatory function F11 may also prepare one or more alternative defined actions 130 predefined and associated with the multiple defined state transition histories 100, respectively.

Here, each of the alternative defined actions 130 defines a process for controlling predetermined access to a predetermined resource so that the alternative defined action can be executed upon transition from a state of the computer to the next state.

Further, the preparatory function F11 may prepare multiple defined external states associated with the multiple defined actions 130, respectively.

Here, each of the defined external states defines an external state as another state that is not defined in the defined state transition histories 100 of the computer. A real external state is an actual external state as the other state that is not defined in the defined state transition histories 100 of the computer.

Further, the preparatory function F11 may associate multiple defined firing conditions 120 with the multiple defined external states, respectively.

Further, the preparatory function F11 may associate the multiple defined firing conditions 120 with the multiple defined state transition histories 100, respectively.

The state transition function F12 is a function for making a transition of an actual state of the computer according to the defined state transition history 100.

The state transition function F12 may make a transition from a real state of the computer to the next defined state 110 when the real state as the actual state of the computer matches a defined state 110 and a defined firing condition 120 associated with the matched defined state 110 is satisfied.

When the real state as the actual state of the computer matches a defined state 110, the state transition function F12 may make a transition from the real state of the computer to the next defined state 110 on condition that a defined firing condition 120 associated with a defined external state associated with the matched defined state 110 and matching a real external state as an actual external state is satisfied.

Further, when the real state as the actual state of the computer matches a defined state 110, the state transition function F12 may make a transition from the real state of the computer to the next defined state 110 on condition that a defined firing condition 120 associated with the matched defined state 110 and associated with a defined state transition history 100 matching a real state transition history as an actual stare transition history is satisfied.

The real state transition history recording function F13 is a function for recording transitions of actual states of the computer.

In other words, the real state transition history recording function F13 is a function for recording one or more combinations of state/firing condition pairs as pairs of actual states of the computer and actually satisfied defined firing conditions 120.

Upon execution of real access to a real resource, the action execution function F16 serves as a function for selecting a defined action 130 associated with a defined stare transition history 100 when there is the defined state transition history 100 matching a real state transition history from among one or more defined actions 130, each defined to be executable when a transition is made from a defined state 110 matching a real state of the computer to the next defined state 110, to execute the defined action 130 selected.

Upon execution of real access to a real resource, the action execution function F16 may select a defined action 130 associated with a defined state transition history 100 when there is the defined state transition history 100 matching the real state transition history from among one or more defined actions 130, each defined to be executable when a transition is made from a defined state 110 matching the real state of the computer to the next defined state 110 to the next defined state 110, on condition that a defined firing condition 120 associated with the defined state 110 matching the real state of the computer is satisfied, to execute the defined action 130 selected.

Upon execution of real access to a real resource, if there is no defined state transition history 100 matching the real state transition history, the action execution function F16 may execute an alternative defined action 130, each defined to be executable when a transition is made from a defined state 110 matching the real state of the computer to the next defined state 110.

Upon execution of real access to a real resource, the action execution function F16 may select a defined action 130 associated with a defined external state when there is the defined external state matching the real external state from among one or more defined actions 130, each defined to be executable when a transition is made from a defined state 110 matching the real state of the computer to the next defined state 110, to execute the defined action 130 selected.

Further, upon execution of real access to a real resource, the action execution function may select a defined action 130 associated with a defined state transition history 100 when there is the defined state transition history 100 matching the real state transition history and associated with a defined external state when there is the defined external state matching the real external state from among one or more defined actions 130, each defined to be executable when a transition is made from a defined state 110 matching the real state of the computer to the next defined state 110, to execute the defined action 130 selected.

The external state management function F20 is a function related to transition of an external state inside the computer.

For example, the external state inside the computer is a state of computer peripheral equipment.

For example, the external state inside the computer is a state of the keyboard.

Another system is a system outside the computer.

For example, the other system is an authentication system.

FIG. 4 shows how to make transitions of states of the computer 50 based on a defined state transition history 100.

In the figure, the solid line indicates each state transition defined in the defined state transition history 100.

In the figure, the alternate long and two short dashes line indicates each state transition that is not defined in the defined state transition history 100.

When an operator selects a Save with Encryption menu using a mouse and clicks on the "OK" button in a Confirm Save dialog box appearing through the state transition function F12, the action execution function F16 determines a real state transition history leading up to the state of displaying the Confirm Save dialog box, permits the saving and displays a message saying "The save completed successfully" in the dialog box.

Otherwise, when the operator selects the Save with Encryption menu using the mouse and clicks on the "OK" button in the Confirm Save dialog box appearing through the state transition function F12, the action execution function F16 determines the real state transition history leading up to the state of displaying the Confirm Save dialog box, prohibits the saving and displays a message saying "The save failed" in the dialog box.

Even when malware mimics the operation of pressing the Save with Encryption menu and clicks on the "OK" button in the Confirm Save dialog box appearing through the state transition function F12, the action execution function F16 determines that the real state transition history leading up to the state of displaying the Confirm Save dialog box is not defined in the defined state transition history 100, prohibiting the saving and displaying a message saying "The save failed" in the dialog box.

FIG. 5 shows how to make transitions of states of the computer based on a defined state transition history 100.

The upper part of FIG. 5 shows that when a real state transition history matches the defined state transition history 100, the action execution function displays a Save File dialog box, waiting for ID input and a click on the OK button.

The lower part of FIG. 5 shows that when the real state transition history does not match the defined state transition history 100, the action execution function displays a Save File dialog box using CAPTCHA (Completely Automated Public Turing test to Computers and Humans Apart) technology, waiting for ID input and a click on the OK button.

Figure 6:
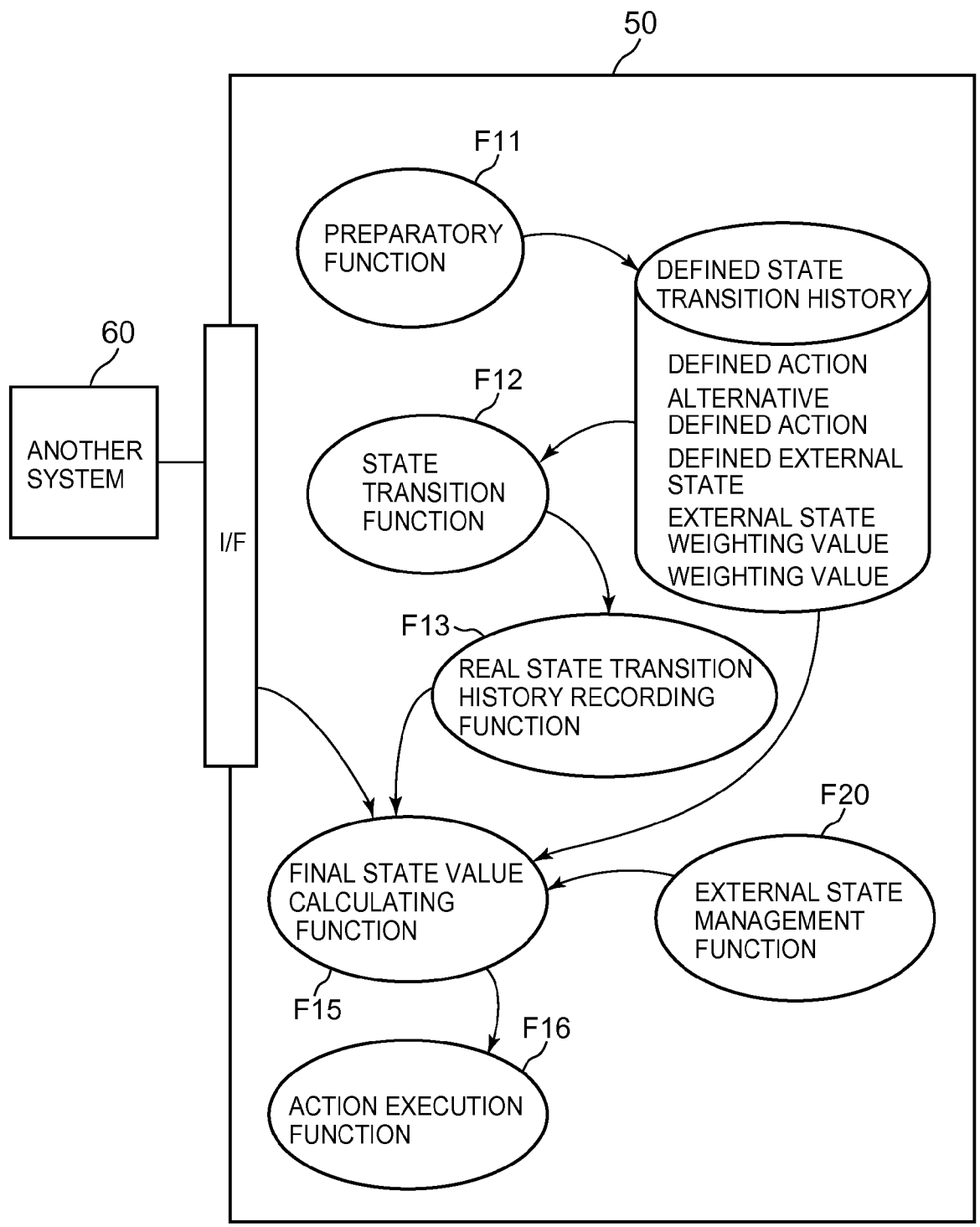
FIG. 6 is a functional block diagram of a resource protection program according to a second embodiment of the present invention.
Figure 7:
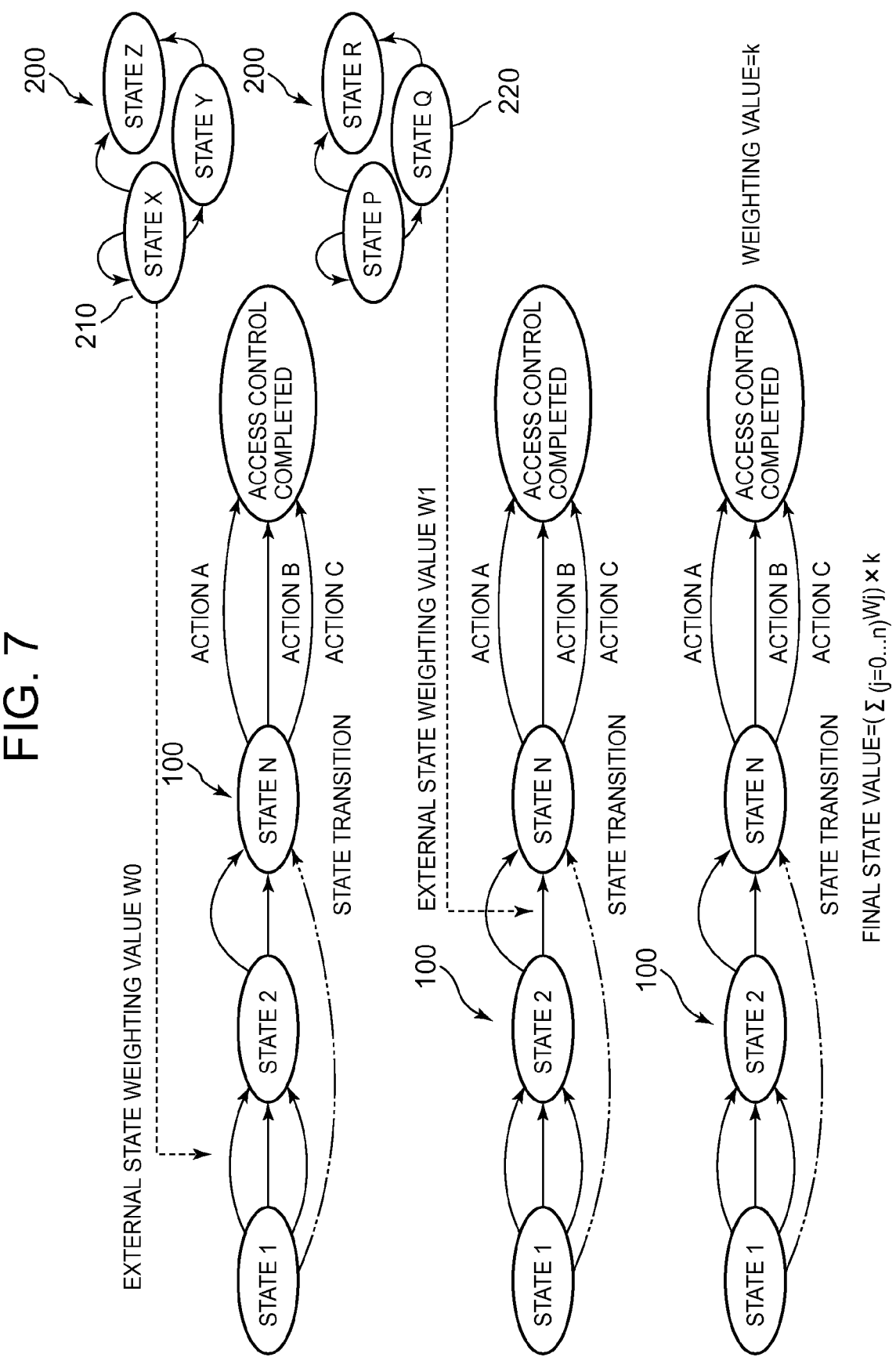
FIG. 7 is a first conceptual diagram of the resource protection program according to the second embodiment of the present invention.
Figure 8:
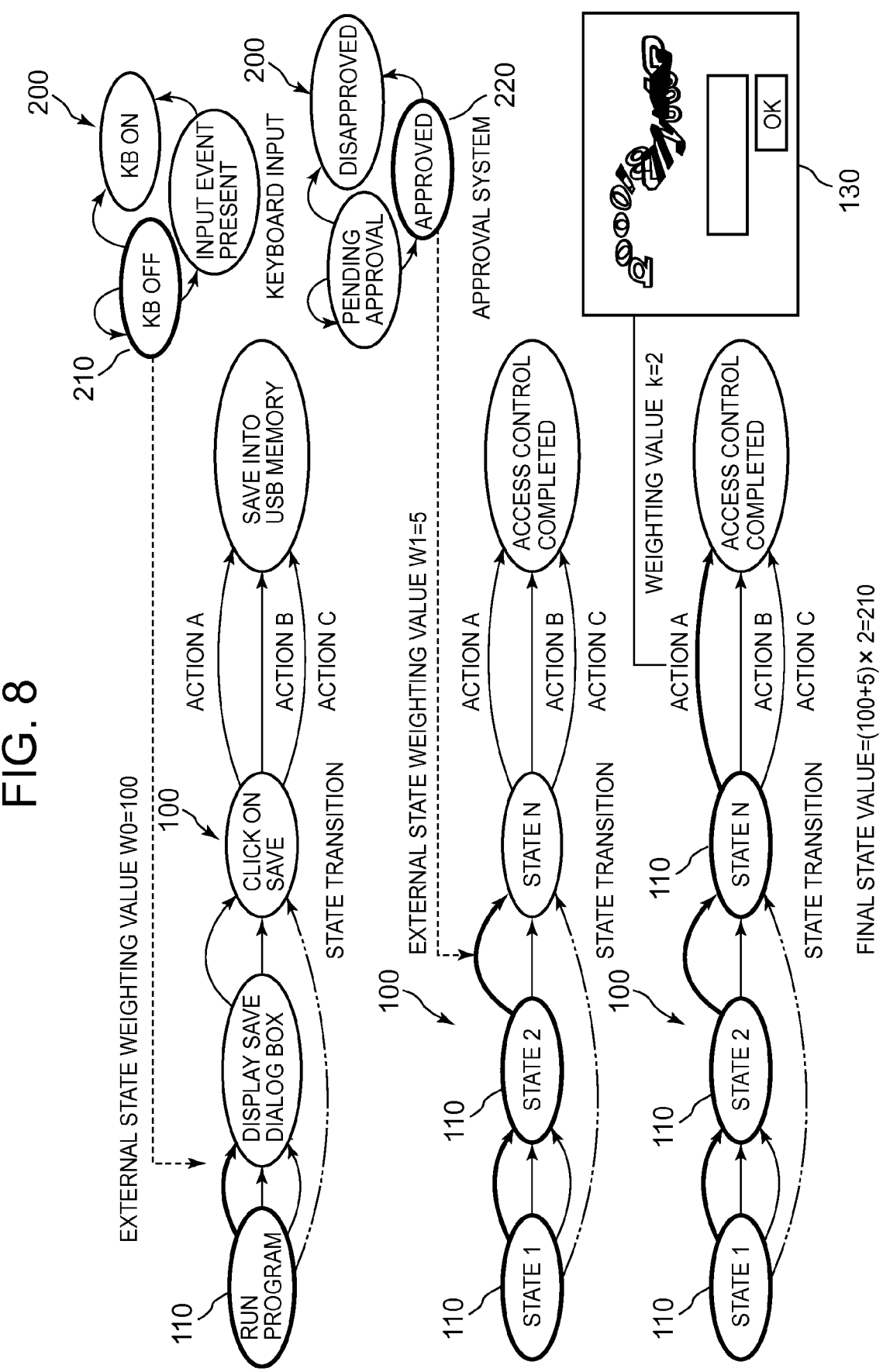
FIG. 8 is a second conceptual diagram of the resource protection program according to the second embodiment of the present invention.

Next, a resource protection program according to a second embodiment of the present invention will be described based on the following drawings; FIG. 6 is a functional block diagram of the resource protection program according to the second embodiment of the present invention; FIG. 7 is a first conceptual diagram of the resource protection program according to the second embodiment of the present invention; and FIG. 8 is a second conceptual diagram of the resource protection program according to the second embodiment of the present invention.

The resource protection program according to the second embodiment of the present invention causes the computer to implement a preparatory function F11, a state transition function F12, a final state value calculating function F15, and an action execution function F16.

The resource protection program according to the second embodiment of the present invention may also cause the computer to implement the preparatory function F11, the state transition function F12, a real state transition history recording function F13, the final state value calculating function F15, and the action execution function F16.

Further, the resource protection program according to the second embodiment of the present invention may cause the computer to implement the preparatory function F11, the state transition function F12, the real state transition history recording function F13, the Final state value calculating function F15, the action execution function F16, and an external state management function F20.

The preparatory function F11 is a function for preparing multiple defined state transition histories 100 and multiple defined actions 130, both of which are predefined and associated with each other, and multiple weighting values k associated, respectively, with the multiple defined state transition histories 100, and associating multiple final state values with the multiple defined actions 130, respectively.

Here, each of the defined state transition histories 100 defines a state transition history as a history of state transitions in the computer upon execution of predetermined access to a predetermined resource.

Each of the defined actions 130 defines a process for controlling predetermined access to a predetermined resource so that the defined action can be executed upon transition from a defined state 110 of the computer to the next defined suite 110.

Each of the final state values is the value of a final state function using each weighting value as the variable.

A real state transition history is a history of actual state transitions in the computer upon execution of real access to a real resource.

The defined state transition history 100 may be one or more serial combinations of state/firing condition pairs as pairs, in each of which a defined state 110 defining a state of the computer is associated with a defined firing condition 120 defining a firing condition for making a transition from the defined state 110 of the computer to the next defined state 110.

The preparatory function F11 also serves as a function for preparing an external state weighting value associated with each of the multiple defined external states.

Here, one or more defined state transitions are associated with one or more defined external states, respectively.

Alternatively, one or more state/firing condition pairs are associated with one or more defined external states, respectively.

Each of the defined external states defines an external state as another state that is not defined in the defined state transition history 100 of the computer.

Each of the final state values is the value of a final state function using a weighting value and an external state weighting value as the variables.

The preparatory function F11 may also prepare one or more alternative defined actions 130 predefined and associated, respectively, with the multiple defined state transition histories 100.

Here, each of the alternative defined actions defines a process for controlling predetermined access to a predetermined resource so that the alternative defined action can be executed upon transition from a state of the computer to the next state.

Further, the preparatory function F11 may prepare multiple defined external states associated, respectively, with the multiple defined actions 130.

Here, each of the defined external states defines an external state as another state that is not defined in the defined state transition history 100 of the computer, and a real external state is an actual external state as another state that is not defined in the defined state transition history 100 of the computer.

The preparatory function F11 may associate the multiple defined firing conditions 120 with the multiple defined external states, respectively.

Here, each of the defined external states defines an external state as another state that is not defined in the defined state transition history 100 of the computer.

The preparatory function F11 may also associate the multiple defined firing conditions 120 with the multiple defined state transitions in the defined state transition history 100, respectively.

The state transition function F12 makes a transition of an actual state of the computer according to the defined state transition history 100.

The state transition function F12 may make a transition from a real state of the computer to the next defined state 110 when the real state as the actual state of the computer matches a defined state 110 and a defined firing condition 120 associated with the matched defined state 110 is satisfied.

When the real state as the actual state of the computer matches a defined state 110, the state transition function F12 may make the transition from the real state of the computer to the next defined state 110 on condition that a defined firing condition 120 associated with the matched defined state 110 and associated with a defined external state matching a real external state as an actual external state is satisfied.

When the real state as the actual state of the computer matches a defined state 110, the state transition function F12 may make the transition from the real state of the computer to the next defined state 110 on condition that a defined firing condition 120 associated with the matched defined state 110 and associated with a defined state transition history 100 matching a real state transition history as an actual state transition history is satisfied.

The real state transition history recording function F13 is a function for recording a transition of an actual state of the computer.

The real state transition history recording function F13 is a function for recording one or more combinations of state/firing condition pairs as pairs of actual states of the computer and actually satisfied defined firing conditions 120.

The final state value calculating function F15 is a function for calculating a final state function using a determined weighting value as the variable to obtain a final state value.

Here, the determined weighting value k is a weighting value associated with the defined state transition history 100 matching the real state transition history.

The final state value calculating function F15 may also serve as a function for calculating a final state function using a determined weighting value k and a determined external state weighting value Wi as the variables to obtain a final state value.

Here, the determined external state weighting value is an external state weighting value associated with a defined external state associated with a defined state transition matching an actual state transition leading up to the real stare of the computer.

Alternatively, the determined weighting value is a weighting value associated with the defined state transition history 100 marching the real state transition history.

The determined external state weighting value is an external state weighting value associated with a defined external state associated with a state/firing condition pair as a pair of a defined state 110 matching the real state of the computer and a defined firing condition 120 matching the satisfied firing condition.

For example, the final state value is the product of the determined weighting value k and the sum of the multiple determined external state weighting values Wi.

For example, the final state value is a total value of the determined weighting value k and the sum of the multiple determined external state weighting values Wi.

Upon execution of real access to a real resource, the action execution function F15 serves as a function for selecting a defined action 130 associated with the final state value from among one or more defined actions 130, each defined to be executable when a transition is made from a defined state 110 matching the real state of the computer to the next defined state 110, to execute the defined action 130 selected.

Upon execution of real access to a real resource, the action execution function F15 may select a defined action 130 associated with the final state value from among one or more defined actions 130, each defined to be executable when the transition is made from the defined state 110 matching the real state of the computer to the next defined state 110, on condition that a defined firing condition 120 associated with the defined state 110 matching the real state of the computer is satisfied, to execute the defined action 130 selected.

Upon execution of real access to a real resource, if there is no defined action 130 associated with the final state value, the action execution function F15 may execute an alternative defined action 130 defined to be executable when the transition is made from the defined state 110 matching the real state of the computer to the next defined state 110.

Upon execution of real access to a real resource, the action execution function F15 may select a defined action 130 associated with a defined external state when there is the defined external state matching a real external state from among one or more defined actions 130, each defined to be executable when the transition is made from the defined state 110 matching the real state of the computer to the next defined state 110, to execute the defined action 130 selected.

Further, upon execution of real access to a real resource, the action execution function F15 in a select a defined action 130 associated with a defined external state when there is the defined external state associated with the final state value and matching the real external state from among one or more defined actions 130, each defined to be executable when the transition is made from the defined state 110 matching the real state of the computer to the next defined state 110, to execute the defined action 130 selected.

The external state management function F20 is a function related to transition of an external state inside the computer.

For example, the external state inside the computer is a state of computer peripheral equipment.

For example, the external state inside the computer is a state of the keyboard.

Another system is a system outside the computer.

For example, the other system is an authentication system.

FIG. 7 shows how to make transitions of states of the computer based on a defined state transition history.

In the figure, the solid line indicates each state transition defined in the defined state transition history.

In the figure, the alternate long and two short dashes line indicates each state transition that is not defined in the defined state transition history.

In the figure, a first external state indicates state transitions among state X, stare Y, and state Z. Here, state X is a defined external state.

In the figure, a second external state indicates a state transition among state P, state Q, and state R. Here, state Q is a defined external state.

Upon transition from state 1 to state 2, die external state weighting value W0 is identified with reference to the fact that the state of the first external state is state X.

Upon transition from state 2 to state N, the external state weighting value W1 is identified with reference to the fact that the state of the second external state is state Q.

The weighting value k is identified from a real state transition history in which the state of the computer reaches state N.

The final state value is calculated from the weighting value and the two external state weighting values, and an action associated with the calculated final state value is executed.

FIG. 8 shows how to make transitions of states of the computer based on a defined state transition history.

In the figure, the solid line indicates each state transition defined in the defined state transition history.

In the figure, the bold solid line indicates a history of actual state transitions.

In the figure, the alternate long and two short dashes line indicates each state transition that is not defined in the defined state transition history.

In the figure, the first external state indicates state transitions among state X, state Y, and state Z shown in FIG. 7. In other words, in FIG. 8, state X is a state indicative of Keyboard Off, state Y is a state indicative of Input Event Present, and state Z is a state indicative of Keyboard On.

In the figure, the second external state indicates state transitions among state P, state Q, and state R shown in FIG. 7. In other words, in FIG. 8, state Q is a state of Pending Approval, suite Q is Approved state, and state R is Disapproved state. After the state remains in state Q for a predetermined period of time, a transition to state R is made.

The upper part of FIG. 8 shows a transition from state 1 to state 2 in FIG. 7. External state weighting value W0=100 is identified with reference to the fact that the state of the first external state is KB Off (state X in FIG. 7).

The middle part of FIG. 8 shows a transition from state 2 to state N. External state weighting value W1=5 is identified with reference to the (act that the state of the second external state is Approved (state Q in FIG. 7).

Weighting value k=2 is identified from the real state transition history indicative of the transition of the state of the computer from state 1 to state N.

The lower part of FIG. 8 shows that final state value=210 is calculated from the weighting value and the two external state weighting values, and action A associated with the calculated final stare value is executed.

Action A is such that a Save File dialog box 130 using CAPTCHA (Completely Automated Public Turing test to Computers and Humans Apart) technology and final state value=210 as a parameter appears to wait for ID input and a click on the OK button.

For example, the larger the final state value, the larger the degree of deformation of the characters.

Figure 9:
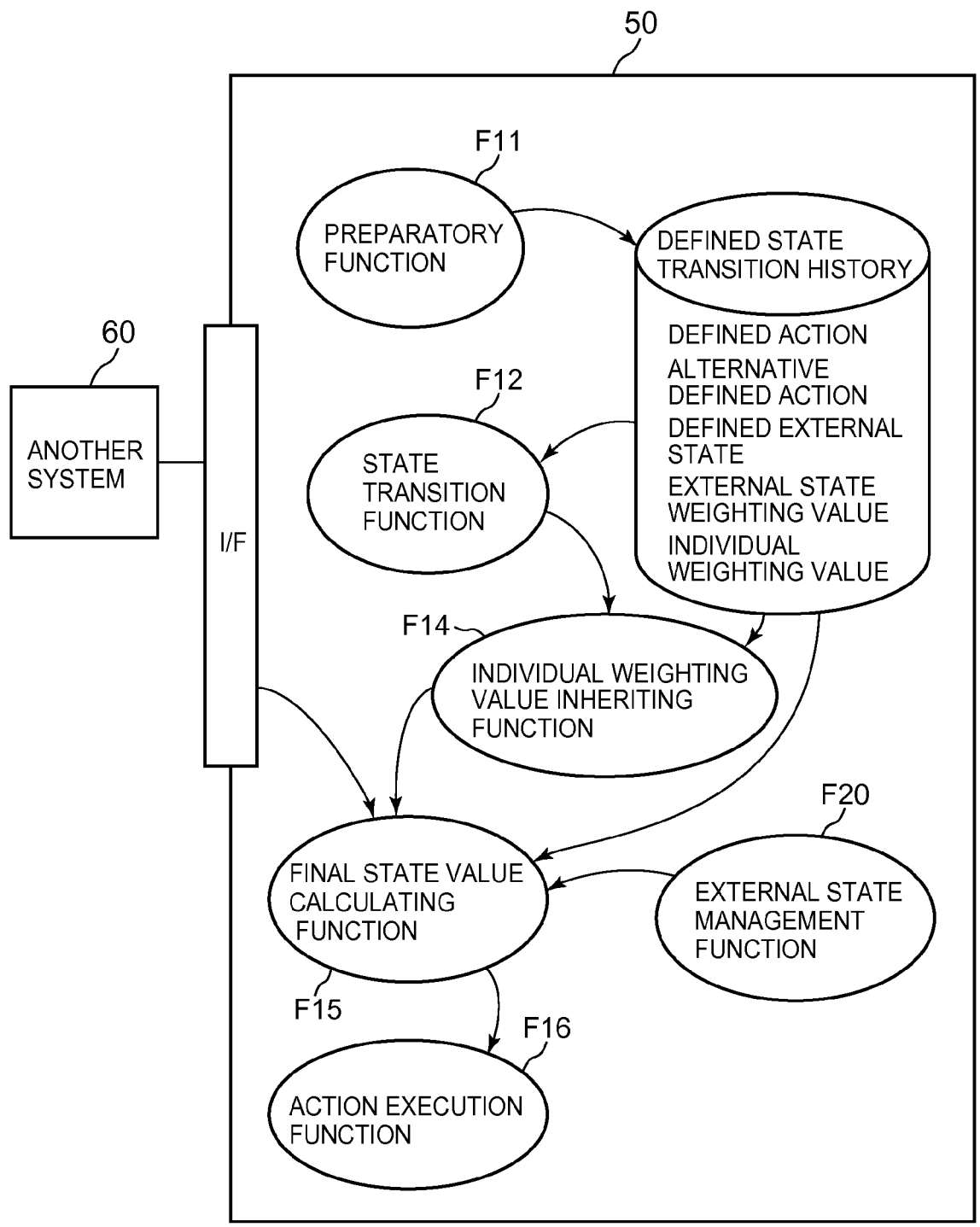
FIG. 9 is a functional block diagram of a resource protection program according to a third embodiment of the present invention.
Figure 10:
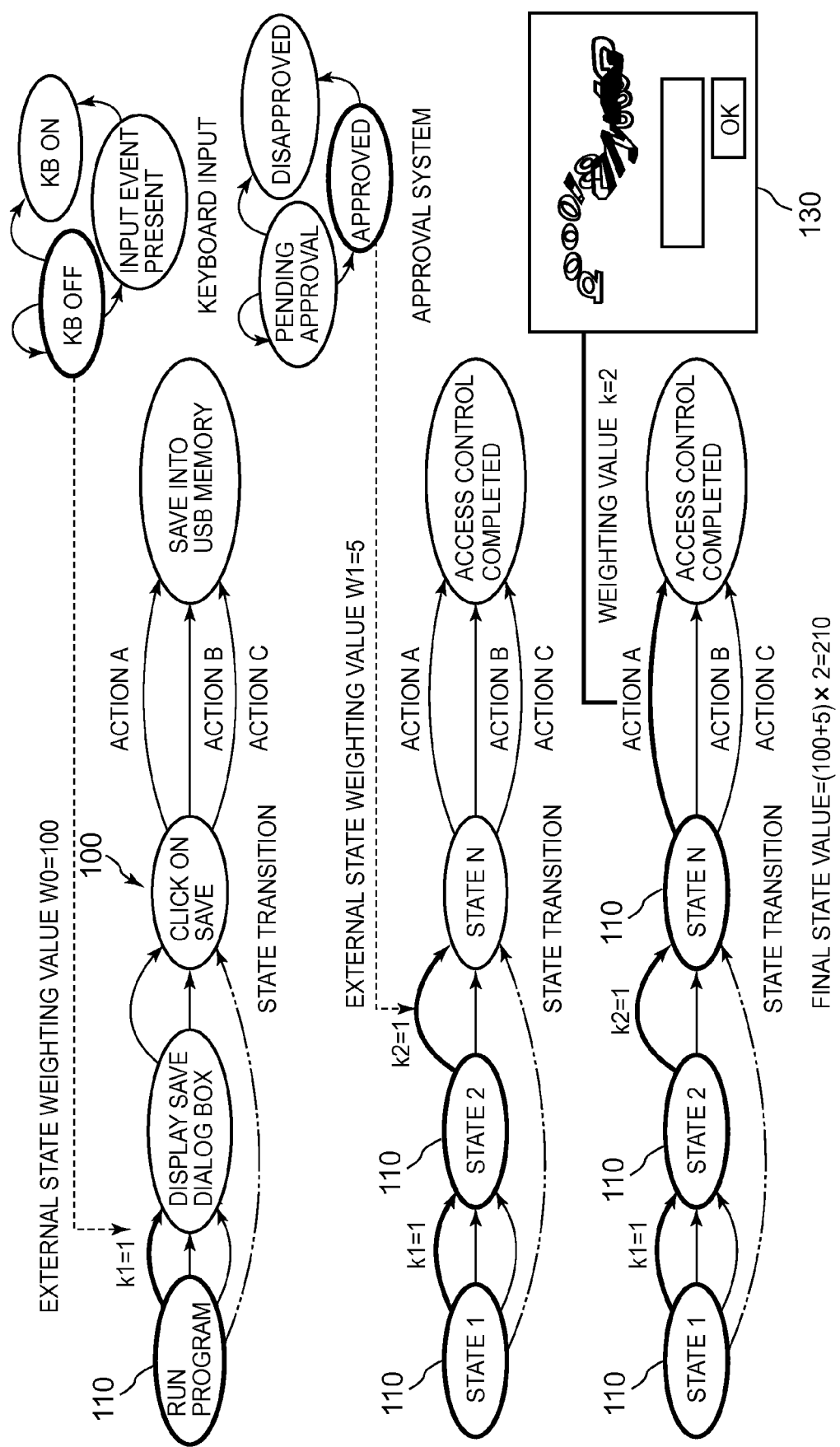
FIG. 10 is a conceptual diagram of the resource protection program according to the third embodiment of the present invention.

Next, a resource protection program according to a third embodiment of the present invention will be described based on the following drawings: FIG. 8 is the second conceptual diagram of the resource protection program according to the second embodiment of the present invention; FIG. 9 is a functional block-diagram of the resource protection program according to the third embodiment of the present invention; and FIG. 10 is a conceptual diagram of the resource protection program according to the third embodiment of the present invention.

The resource protection program according to the third embodiment of the present invention causes the computer to implement a preparatory function F11, a state transition function F12, a final state value calculating function F15, and an action execution function F16.

The resource protection program according to the third embodiment of the present invention may also cause the computer to implement the preparatory function F11, the state transition function F12, an individual weighting value inheriting function F14, the final state value calculating function F15, and the action execution function F16.

Further, the resource protection program according to the third embodiment of the present invention may cause the computer to implement the preparatory function F11, the state transition function F12, the individual weighting value inheriting function F14, the final state value calculating function F15, the action execution function F16, and an external state management function F20.

The preparatory function F11 is a function for preparing multiple defined state transition histories 100 and multiple defined actions 130, both of which are predefined and associated with each other, preparing multiple individual weighting values associated, respectively, with multiple defined state transitions in the computer, and associating multiple final state values with the multiple defined actions 130.

Here, each of the defined state transition histories 100 defines a state transition history as a history of state transitions in the computer upon execution of predetermined access to a predetermined resource.

Each of the defined actions 130 defines a process for controlling predetermined access to a predetermined resource so that the defined action can be executed upon transition from a defined state 110 of the computer to the next defined state 110.

Each of the final state values is the value of a final state function using each of multiple individual weighting values $k_i$ as the variable, where the multiple individual weighting values are associated, respectively, with multiple defined state transitions matching multiple state transitions leading up to a predetermined state.

A real state transition history is a history of actual state transitions in the computer upon execution of real access as actual access to a real resource as an actual resource.

The preparatory function F11 also serve as a function for preparing external state weighting values $k_i$ associated, respectively, with multiple defined external states, and associating one or more defined state transitions in the computer with one or more defined external states, respectively.

Here, each of the defined external states defines an external state as another state that is not defined in the defined state transition history 100 of the computer. Each of the final state values is the value of a final state function using one or more determined individual weighting values $k_i$ and determined external state weighting values $W_i$ as the variables.

The defined state transition history 100 may include one or more serial combinations of state/firing condition pairs as pairs in each of which a defined state 110 defining a state of the computer is associated with a defined firing condition 120 defining a firing condition for making a transition from the defined state 110 of the computer to the next defined state 110.

Further, the preparatory function F11 serves as a function for preparing multiple defined state transition histories 100 and multiple defined actions 130, both of which are predefined and associated with each other, preparing multiple individual weighting values associated, respectively, with multiple state/firing condition pairs, and associating multiple final state values with the multiple defined actions 130.

Here, each of the defined state transition histories 100 defines a state transition history as a history of state transitions in the computer upon execution of predetermined access to a predetermined resource.

Each of the defined actions 130 defines a process for controlling predetermined access to a predetermined resource so that the defined action can be executed upon transition from a defined state 110 of the computer to the next defined state 110.

Each of the final state values is the value of a final state function using multiple individual weighting values as the variables, where the multiple individual weighting values are associated, respectively, with multiple state/firing condition pairs as pairs of multiple defined states 110, which match multiple states, respectively, leading up to a predetermined state and between which a transition has been made, and multiple defined firing conditions 120 satisfied, respectively.

A real state transition history is a history of actual state transitions in the computer upon execution of real access as actual access to a real resource as an actual resource.

The preparatory function F11 may also prepare external state weighting values associated, respectively, with the multiple defined external states, and associate one or more state/firing condition pairs with one or more defined external states.

Here, each of the defined external states defines an external state as another state that is not defined in the defined state transition history 100 of the computer.

Each of the final state values is the value of a final state function using one or more determined individual weighting values and determined external state weighting values as the variables.

Further, the preparatory function F11 serves as a function for preparing one or more alternative defined actions predefined and associated with the multiple defined state transition histories 100, respectively. Here, each of the alternative defined actions defines a process for controlling predetermined access to a predetermined resource so that the alternative defined action can be executed upon transition from a state of the computer to the next state.

Further, the preparatory function F11 serves as a function for preparing multiple defined external states associated, respectively, with the multiple defined actions 130.

Here, each of the defined external states defines an external state as another state that is not defined in the defined state transition history 100 of the computer. A real external state is an actual external state as another state that is not defined in the defined state transition history 100 of the computer.

The preparatory function F11 may associate the multiple defined firing conditions 120 with the multiple defined external states, respectively. Each of the defined external states defines an external state as another state that is not defined in the defined state transition history 100 of the computer.

The preparatory function F11 may also associate the multiple defined firing conditions 120 with the multiple defined state transition histories 100, respectively.

The state transition function F12 makes a transition of an actual state of the computer according to the defined state transition history 100.

The state transition function F12 may make a transition from a real state of the computer to the next defined state 110 when the real state as the actual state of the computer matches a defined state 110 and a defined firing condition 120 associated with the matched defined state 110 is satisfied.

When the real state as the actual state of the computer matches a defined state 110, the state transition function F12 may make the transition from the real state of the computer to the next defined state 110 on condition that a defined firing condition 120 associated with the matched defined state 110 and associated with a defined external state matching a real external state as an actual external state is satisfied.

When the real state as the actual state of the computer marches a defined state 110, the state transition function F12 may make the transition from the real state of the computer to the next defined state 110 on condition that a defined firing condition 120 associated with the matched defined state 110 and associated with a defined state transition history 100 matching a real state transition history as an actual state transition history is satisfied.

The individual weighting value inheriting function F14 is a function for inheriting an individual weighting value, identified each lime a transition from a real state to the next state is made in connection with transition of a state of the computer, together with the transition of the real state.

The individual weighting value inheriting function F14 may calculate a weighting value k each time an individual weighting value ki is inherited.

The final state value calculating function F15 is a function for calculating a final state function using multiple determined individual weighting values as the variables to obtain a final state value.

Here, the multiple determined individual weighting values are multiple individual weighting values associated, respectively, with multiple defined state transitions matching multiple actual state transitions leading up to the real state of the computer upon execution of real access to a real resource.

The final state value calculating function F15 serves as a function for calculating a final state function using multiple determined individual weighting values ki as the variables to obtain a final state value.

Here, the multiple determined individual weighting values are multiple individual weighting values associated, respectively, with multiple state/firing condition pairs as pairs of defined states 110, which match real states when transitions from real states to subsequent real states are made sequentially according to the transitions of the real states of the computer upon execution of real access to a real resource, and satisfied defined firing conditions 120.

The final state value calculating function F15 also serves as a function for calculating a final state function using one or more determined individual weighting values ki and determined external state weighting values Wi as the variables to obtain a final state value.

Here, the multiple determined individual weighting values are multiple individual weighting values associated, respectively, with multiple defined state transitions matching multiple actual state transitions leading up to the real state of the computer upon execution of real access to a real resource.

The determined external state weighting values are external state weighting values associated with defined external states associated with defined state transitions matching actual state transitions leading up to the real state of the computer.

For example, the final state value is the product of the sum of the multiple determined individual weighting values ki and the sum of the multiple determined external state weighting values Wi.

For example, the final state value is a total value, of the sum of the multiple determined individual weighting values ki and the sum of the multiple determined external state weighting values Wi.

Further, the final state value calculating function F15 serves as a function for calculating a final state function using one or more determined individual weighting values ki and determined external state weighting values Wi as the variables to obtain a final state value.

Here, the multiple determined individual weighting values are multiple individual weighting values associated, respectively, with multiple state/firing condition pairs of defined states 110, which match real states when transitions from real states to subsequent real states are made sequentially according to the transitions of the real states of the computer upon execution of real access to a real resource, and the satisfied defined firing conditions 120. The determined external state weighting values are external state weighting values associated with defined external stares associated with state/firing condition pairs as pairs in each of which a defined state 110 matching the real state of the computer is associated with a defined firing condition 120 matching a satisfied firing condition.

Upon execution of real access to a real resource, the action execution function F16 serves as a function for selecting a defined action 130 associated with the final state value from among one or more defined actions 130, each defined to be executable when a transition from a defined state 110 matching a real state of the computer to the next defined state 110 is made, to execute the defined action 130 selected.

Upon execution of real access to a real resource, the action execution function F16 may select a defined action 130 associated with the final state value from among one or more defined actions 130, each defined to be executable when a transition from a defined state 110 matching a real state to the next defined state 110 is made, on condition that a defined firing condition 120 associated with the defined state 110 matching the real state of the computer is satisfied, to execute the defined action 130 selected.

Upon execution of real access to a real resource, if there is no defined action 130 associated with the final state value, the action execution function F16 may execute an alternative defined action 130 defined to be executable when a transition from a defined state 110 matching the real state of the computer to the next defined state 110 is made.

Further, the action execution function F16 may select a defined action 130 associated with a defined external state when there is the defined external state matching a real external state from among one or more defined actions 130, each defined to be executable when a transition from a defined state 110 matching the real state of the computer to the next defined state 110 is made, to execute the defined action 130 selected.

Further, action execution function 116 may select a defined action 130 associated with the final state value and associated with a defined external state when there is the defined external state matching a real external state from among one or more defined actions 130, each defined to be executable when a transition from a defined state 110 matching the real state of the computer to the next defined state 110 is made, to execute the defined action 130 selected.

The external state management function F20 is a function related to transition of an external state inside the computer.

For example, the external state inside the computer is a state of computer peripheral equipment.

For example, the external state inside the computer is a state of the keyboard.

Another system is a system outside the computer.

For example, the other system is an authentication system.

FIG. 10 shows how to make transitions of states of the computer based on a defined state transition history.

In the figure, the solid line indicates each state transition defined in the defined state transition history.

In the figure, the bold solid line indicates a history of actual state transitions.

In the figure, the alternate long and two short dashes fine indicates each state transition that is not defined in the defined state transition history.

In the figure, Keyboard Input (first external state) indicates state transitions among state X, state Y, and state Z shown in FIG. 7. In other words, in FIG. 10, state X is a state indicative of Keyboard Off, state Y is a state indicative of Input Event Present, and state Z is a state indicative of Keyboard On.

In the figure, Approval System (second external state) indicates state transitions among state P, state Q, and state R shown in FIG. 7. In other words, in FIG. 10, state Q is a state of Pending Approval, state Q is Approved state, and state R is Disapproved state. After the state remains in state Q for a predetermined period of time, a transition to state R is made.

The upper part of FIG. 10 shows a transition from state 1 to state 2 in FIG. 7. External state weighting value W0=100 is identified with reference to the fact that the state of the first external state is KB Off (state X in FIG. 7).

The middle, pan of FIG. 10 shows a transition from state 2 to state N. External state weighting value W1=5 is identified with reference to the fact that the state of the second external state is Approved (state Q in FIG. 7).

Individual weighting value k1=1 is identified from a real state transition history in which the transition of the state of the computer is made from state 1 to state 2.

Individual weighting value k2=1 is identified from a real state transition history in which the transition of the state of the computer is made from state 2 to state N.

The lower part of FIG. 10 shows that final state value=210 is calculated from the multiple individual weighting values 1, 1, and the two external state weighting values, and action A associated with the calculated final state value is executed.

Action A is such that a Save file dialog box using CAPTCHA (Completely Automated Public Turing test to Computers and Humans Apart) technology and final state value=210 as a parameter appears to wait for ID input and a click on the OK button.

Next, a resource protection program according to a further embodiment of the present invention will be described based on the following diagram.

Figure 11:
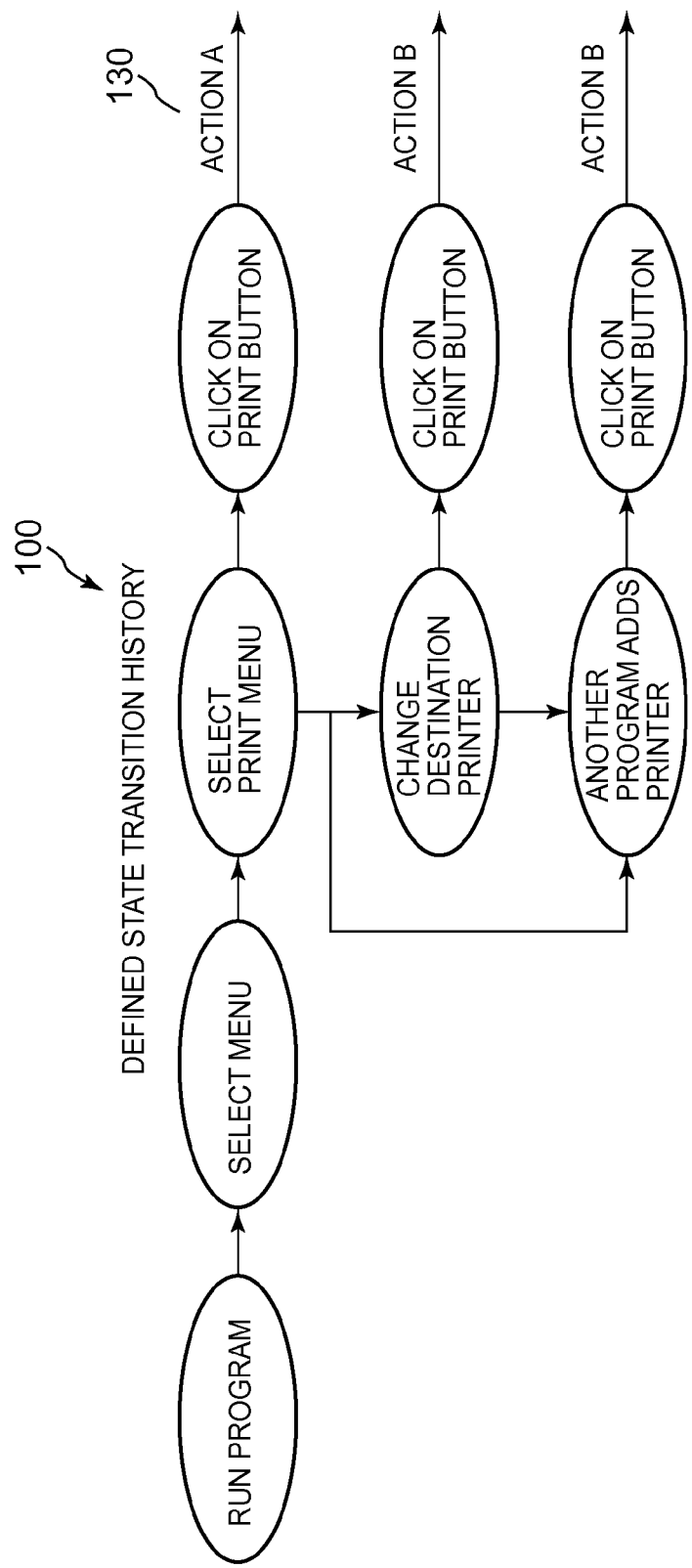
FIG. 11 is a conceptual diagram of a resource protection program according to a further embodiment of the present invention.

FIG. 11 is a conceptual diagram of the resource protection program according to the further embodiment of the present invention.

The resource protection program according to the further embodiment of the present invention can be realized by any one of the resource protection programs according to the aforementioned first to third embodiments.

FIG. 11 shows how to control the level of access to a resource according to a state transition history.

For example, in a state transition history leading up to a state of clicking on a print button, action A is executed with the click on the print button immediately after a print menu is selected. In this case, Copy to USB Memory is disapproved, and Print on In-house Printer, Print on Outside Printer, and Print Screen are approved.

Further, for example, in the state transition history leading up to the state of clicking on the print button, action B is executed when the destination printer is changed after the print menu is selected. In this case, Copy to USB Memory, Print on In-house Printer, and Print on Outside Printer are disapproved, and Print Screen is approved.

Further, for example, in the state transition history leading up to the state of clicking on the print button, action C is executed when another program adds a printer after the print menu is selected. In this case. Copy to USB Memory. Print on In-house Printer, Print on Outside Printer, and Print Screen are disapproved.

These functions may be implemented by using a technique for changing firing conditions depending on the state transition history.

Next, a resource protection apparatus according to one preferred embodiment of the present invention will be described.

The resource protection apparatus according to the embodiment of the present invention is configured to include preparation means, state transition means, and action execution means.

The preparation means, the state transition means, and the action execution means are means for fulfilling the same functions as the preparatory function, the state transition function, and the action execution function as described with respect to the resource protection program according to the embodiment of the present invention.

The resource protection apparatus according to the embodiment of the present invention may be realised by a computer.

Since there is no difference in the other configuration elements, redundant description will be omitted.

Next, a resource protection apparatus according to a first embodiment of the present invention will be described.

The resource protection apparatus according to the first embodiment of the present invention is configured to include preparation means, state transition means, and action execution means.

The resource protection apparatus according to the first embodiment of the present invention may also be configured to include preparation means, state transition means, real state transition history recording means, and action execution means.

Further, the resource protection apparatus according to the first embodiment of the present invention may be configured to include preparation means, state transition means, real state transition history recording means, action execution means, and external state management means.

The preparation means, the state transition means, the real state transition history recording means, the action execution means, and the external state management means are means for fulfilling the same functions as the preparatory function F11, the state transition function F12, the real state transition history recording function F13, the final state value calculating function F15, the action execution function F16, and the external state management function F20 as described with respect to the resource protection program according to the first embodiment.

Since there is no difference in the other configuration elements, redundant description will be omitted.

Next, a resource protection apparatus according to a second embodiment of the present invention will be described.

The resource protection apparatus according to the second embodiment of the present invention is configured to include preparation means, state transition means, final state value calculating means, and action execution means.

The resource protection apparatus according to the second embodiment of the present invention may also be configured to include preparation means, state transition means, real state transition history recording means, final state value calculating means, and action execution means.

Further, the resource protection apparatus according to the second embodiment of the present invention may be configured to include preparation means, state transition means, real state transition history recording means, final state value calculating means, action execution means, and external state management means.

The preparation means, the state transition means, the real state transition history recording means, the final state value calculating means, the action execution means, and external state management means are means for fulfilling the same functions as the preparatory function, the state transition function, the real state transition history recording function, the final state value calculating function, the action execution function, and the external state management function as described with respect to the resource protection program according to the second embodiment of the present invention.

Since there is no difference in the other configuration elements, redundant description will be omitted.

Next, a resource protection apparatus according to a third embodiment of the present invention will be described.

The resource protection apparatus according to the third embodiment of the present invention is configured to include preparation means, state transition means, final state value calculating means, and action execution means.

The resource protection apparatus according to the third embodiment of the present invention may also be configured to include preparation means, state transition means, individual weighting value inheriting means, final state value calculating means, and action execution means.

Further, the resource protection apparatus according to the third embodiment of the present invention may be configured to include preparation means, state transition means, individual weighting value inheriting means, final state value calculating means, action execution means, and external state management means.

The preparation means, the state transition means, the individual weighting value inheriting means, the final state value calculating means, the action execution means, and the external state management means are means for fulfilling the same functions as the preparatory function F11, the state transition function F12, the individual weighting value inheriting function F14, the final state value calculating function F15, the action execution function F16, and the external state management function F20 as described with respect to the resource protection program according to the third embodiment of the present invention.

Since there is no difference in rite other configuration elements, redundant description will be omitted.

Next, a resource protection method according to one preferred embodiment of the present invention will be described.

The resource protection method according to the embodiment of the present invention is configured to include a preparation step, a state transition step, and an action execution step.

The preparation step, the state transition step, and the action execution step are steps of fulfilling the same functions as the preparatory function, the state transition function, and the action execution function as described with respect to the resource protection program according to the embodiment of the present invention.

The resource protection method according to the embodiment of the present invention may be executed by a computer.

Since there is no difference in the other configuration elements, redundant description will be omitted.

Next, a resource protection method according to a first embodiment of the present invention will be described.

The resource protection method according to the first embodiment of the present invention is configured to include a preparation step, a state transition step, and an action execution step.

The resource protection method according to the first embodiment of the present invention may also be configured to include a preparation step, a state transition step, a real state transition history recording step, and an action execution step.

Further, the resource protection method according to the first embodiment of the present invention may be configured to include a preparation step, a state transition step, a real state transition history recording step, an action execution step, and an external state management step.

The preparation step, the state transition step, the real state transition history recording step, the action execution step, and the external state management step are steps of fulfilling the same functions as the preparatory function F11, the state transition function F12, the real state transition history recording function F13, the final state value calculating function F15, the action execution function F16, and the external state management function F20 as described with respect to the resource protection program according to the first embodiment.

Since there is no difference in the other configuration elements, redundant description will be omitted.

Next, a resource protection method according to a second embodiment of the present invention will be described.

The resource protection method according to the second embodiment of the present invention is configured to include a preparation step, a state transition step, a final state value calculating step, and an action execution step.

The resource protection method according to the second embodiment of the present invention may also be configured to include a preparation step, a state transition step, a real state transition history recording step, a final state value calculating step, and an action execution step.

Further, the resource protection method according to the second embodiment of the present invention may be configured to include a preparation step, a state transition step, a real state transition history recording step, a final state value calculating step, an action execution step, and an external state management step.

The preparation step, the state transition step, the real state transition history recording step, the final state value calculating step, the action execution step, and the external state management step are steps of fulfilling the same functions as the preparatory function, the state transition function, the real state transition history recording function, the final state value calculating function, the action execution function, and the external state management function as described with respect to the resource protection program according to the second embodiment of the present invention.

Since there is no difference in the other configuration elements, redundant description will be omitted.

Next, a resource protection method according to a third embodiment of the present invention will be described.

The resource protection method according to the third embodiment of the present invention is configured to include a preparation step, a state transition step, a final state value calculating step, and an action execution step.

The resource protection method according to the third embodiment of the present invention may also be configured to include a preparation step, a state transition step, an individual weighting value inheriting step, a final state value calculating step, and an action execution step.

Further, the resource protection method according to the third embodiment of the present invention may be configured to include a preparation step, a state transition step, an individual weighting value inheriting step, a final state value calculating step, an action execution step, and an external state management step.

The preparation step, the state transition step, the individual weighting value inheriting step, the final state value calculating step, the action execution step, and the external state management step are steps of fulfilling the same functions as the preparatory function F11, the state transition function F12, the individual weighting value inheriting function F14, the final state value calculating function F15, the action execution function F16, and the external state management function F20 as described with respect to the resource protection program according to the third embodiment of the present invention.

Since there is no difference in the other configuration elements, redundant description will be omitted.

The configurations of the resource protection program, the resource protection apparatus, and the resource protection method according to the first embodiment of the present invention have the following advantages.

A transition of a state of a computer is made according to a defined state transition history 100 in which the state of the computer is predefined, and upon execution of real access to a real resource, a defined action 130 associated with an actual state transition history is selected and executed from among multiple defined actions 130 each defined to be executable when a transition from an actual state is made. Thus, an appropriate action can be executed according to the state transition history in the actual state of the computer to control the access to the resource properly.

Also, a state transition history of the computer is defined by one or more serial combinations of pairs of defined states 110 and defined firing conditions 120 to make a transition of a state when a firing condition is satisfied, and upon execution of real access to a real resource, a defined action 130 associated with an actual state transition history is selected and executed from among multiple defined actions 130, each defined to be executable when a transition from an actual state is made, on condition that a firing condition associated with the state is satisfied. Thus, an appropriate action can be executed according to the state transition history in the actual state of the computer to control the access to the resource properly.

Further, an alternative defined action is defined separately, and upon execution of real access to a real resource, the alternative defined action is executed when the state transition history is not that in the actual state. Thus, even when there is no supposed state transition history in the actual state of the computer, an appropriate action can be executed to control the access to the resource properly.

Further, an external state as another state that is not defined in the defined state transition history 100 is associated with a defined action 130, and upon execution of real access to a real resource, the defined action 130 associated with the external state is selected and executed from among multiple defined actions 130 each defined to be executable when a transition from an actual state is made. Thus, an appropriate action can be executed according to the external state of the computer to control the access to the resource properly.

Further, the state transition history of the computer is defined by one or more combinations of pairs of defined states 110 and defined firing conditions 120, an external state as another stare that is not defined in the defined state transition history 100 is associated with a firing condition, and upon execution of real access to a real resource, a transition from a state of the computer to the next state is made on condition that the firing condition associated with the external state is satisfied. Thus, the transition of the state of the computer can be dynamically made according to the external state to control the access to the resource properly.

Further, the state transition history of the computer is defined by one or more combinations of pairs of defined states 110 and defined firing conditions 120, the defined state transition history 100 is associated with a firing condition, and upon execution of real access to a real resource, a transition from a state of the computer to the next state is made on condition that the firing condition associated with the state transition history is satisfied. Thus, the transition of the state of the computer can be dynamically made according to the state transition history to control the access to the resource properly.

The configurations of the resource protection program, the resource protection apparatus, and the resource protection method according to the second embodiment of the present invention have the following advantages.

A transition of a state of a computer is made according to a defined state transition history 100 in which die state of the computer is predefined, a final state value is calculated based on a weighting value associated with a state transition history, and upon execution of real access to a real resource, a defined action 130 associated with the final state value is selected and executed from among multiple defined actions 130, each defined to be executable when a transition from an actual state is made. Thus, an appropriate action can be executed according to the state transition history in the actual state of the computer to control the access to the resource properly.

Also, an external state as another state that is not defied in the defined state transition history 100 is associated with an external state weighting value, a transition of a state of the computer is made according to the defined state transition history 100 in which the state of the computer is predefined, a final state value is calculated based on a weighting value associated with a state transition history and the external state weighting value, and upon execution of real access to a real resource, a defined action 130 associated with the final state value is selected and executed from among multiple defined actions 130, each defined to be executable when a transition is made from an actual state. Thus, an appropriate action can be executed according to the state transition history in the actual state of the computer and the external state to control the access to the resource properly.

Further, a state transition history of the computer is defined by one or more combinations of pairs of defined states 110 and defined firing conditions 120 to make a transition of a state when a firing condition is satisfied, and upon execution of real access to a real resource, a defined action 130 associated with a final state value is selected and executed from among multiple defined actions 130, each defined to be executable when a transition from an actual state is made, on condition that a firing condition associated with the state is satisfied. Thus, an appropriate action can be executed according to the state transition history in the actual state of the computer to control the access to the resource properly.

Further, an alternative defined action 130 is defined separately, and upon execution of real access to a real resource, the alternative defined action is executed when there is no defined action 130 associated with the final state value. Thus, even when there is no supposed state transition history in the actual state of the computer, an appropriate action can be executed to control the access to the resource properly.

Further, an external state as another state that is not defined in the defined state transition history 100 is associated with a defined action 130, and upon execution of real access to a real resource, the defined action 130 associated with the external state is selected and executed from among multiple defined actions 130 each defined to be executable when a transition from an actual state is made. Thus, an appropriate action can be executed according to the external state of the computer to control the access to the resource properly.

Further, the state transition history of the computer is defined by one or more combinations of pairs of defined states 110 and defined firing conditions 120, an external state as another state that is not defined in the defined state transition history 100 is associated with a firing condition, and upon execution of real access to a real resource, a transition from a state of the computer to the next state is made on condition that the firing condition associated with the external state is satisfied. Thus, the transition of the state of the computer can be dynamically made according to the external state to control the access to the resource properly.

Further, the state transition history of the computer is defined by one or more combinations of pairs of defined states 110 and defined firing conditions 120, the defined state transition history 100 is associated with a firing condition, and upon execution of real access to a real resource, a transition from a state of the computer to the next state is made on condition that the firing condition associated with the state transition history is satisfied. Thus, the transition of the state of the computer can be dynamically made according to the state transition history to control the access to the resource properly.

The configurations of the resource protection program, the resource protection apparatus, and the resource protection method according to the third embodiment of the present invention have the following advantages.

A transition of a state of a computer is made according to a defined state transition history 100 in which the state of the computer is predefined, a final state value is calculated based on individual weighting values associated, respectively, with multiple state/firing conditions, and upon execution of real access to a real resource, a defined action 130 associated with the final state value is selected and executed from among multiple defined actions 130, each defined to be executable when a transition from an actual state is made. Thus, an appropriate action can be executed according to the state transition history in the actual state of the computer to control the access to the resource properly.

Also, an external state as another state that is not defied in the defined stare transition history 100 is associated with an external state weighting value, a transition of a state of the computer is made according to the defined state transition history 100 in which the state of the computer is predefined, a final state value is calculated based on a weighting value associated with a state transition history and the external state weighting value, and upon execution of real access to a real resource, a defined action 150 associated with the final state value is selected and executed from among multiple defined actions 130, each defined to be executable when a transition is made from an actual state. Thus, an appropriate action can be executed according to the state transition history in the actual state of the computer and the external state to control the access to the resource properly.

Further, the state transition history of the computer is defined by one or more combinations of pairs of defined states 110 and defined firing conditions 120 to make a transition of a state when a firing condition is satisfied, and upon execution of real access to a real resource, a defined action 130 associated with a final state value is selected and executed from among multiple defined actions 130, each defined to be executable when a transition from an actual state is made, on condition that the firing condition associated with the state is satisfied. Thus, an appropriate action can be executed according to the state transition history in the actual state of the computer to control the access to the resource properly.

Further, an alternative defined action 130 is defined separately, and upon execution of real access to a real resource, the alternative defined action is executed when there is no defined action 130 associated with the final state value. Thus, even when there is no supposed state transition history in the actual state of the computer, an appropriate action can be executed to control the access to the resource properly.

Further, an external state as another state that is not defined in the defined state transition history 100 is associated with a defined action 130, and upon execution of real access to a real resource, the defined action 130 associated with the external state is selected and executed from among multiple defined actions 130 each defined to be executable when a transition from an actual state is made. Thus, an appropriate action can be executed according to the external state of the computer to control the access to the resource properly.

Further, the state transition history of the computer is defined by one or more combinations of pairs of defined states 110 and defined firing conditions 120, an external state as another state that is not defined in the defined state transition history 100 is associated with a firing condition, and upon execution of real access to a real resource, a transition from a state of the computer to the next stare is made on condition that the firing condition associated with the external state is satisfied. Thus, the transition of the state of the computer can be dynamically made according to the external state to control the access to the resource properly.

Further, the state transition history of the computer is defined by one or more combinations of pairs of defined states 110 and defined firing conditions 120, the defined state transition history 100 is associated with a firing condition, and upon execution of real access to a real resource, a transition from a state of the computer to the next state is made on condition that the firing condition associated with the state transition history is satisfied. Thus, the transition of the state of the computer can be dynamically made according to the state transition history to control the access to the resource properly.

It should be noted that the present invention is not limited to the aforementioned embodiments, and that various changes can be made without departing from the spirit of the invention.

In the above description, although program routines for fulfilling the functions of the present invention are not discriminated from program routines for fulfilling functions generally provided in an OS or an application on a computer, functions necessary for the program routines to fulfill the functions generally provided in the OS or the application on the computer may be injected to configure the program routines for fulfilling the functions of the present invention, or the program routines for fulfilling the functions generally provided in the OS or the application on the computer may include the program routines for fulfilling the functions of the present invention.

DESCRIPTION OF REFERENCE NUMERALS AND SYMBOLS k Weighting Value
ki Individual Weighting Value
W1 External Stare Weighting Value
50 Computer
51 Computer Main Body
52 Keyboard
53 Monitor
54 External Memory
55 Network
60 Approval System
70 Printer
100 Defined State Transition History
110 Defined State
120 Defined Firing Condition
130 Defined Action
200 Defined External State Transition History
210 First External State
220 Second External State
[Patent Document 1]
Japanese Patent Application Publication No. 2007-280013
[Patent Document 2]
Japanese Patent No. 4547861

What is claimed is:

1. A resource protection program for protecting resources to be processed on a computer comprising a memory with the program stored therein, the program causing the computer to implement:

a preparatory function as a function for preparing a plurality of defined state transition histories and a plurality of defined actions, both of which are predefined and associated with each other, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to a next defined state, and a real state transition history is a history of actual state transitions in the computer upon execution of real access as actual access to a real resource as an actual resource;

a state transition function for making a transition of an actual state of the computer according to a defined state transition history; and an action execution function for executing, upon execution of the real access to the real resource, a defined action associated with a defined state transition history when there is the defined state transition history matching the real state transition history from among one or the plurality of defined actions, each defined to be executable when the transition is made from a defined state matching a real state of the computer to a next defined state, to execute the defined action selected.

2. The resource protection program according to claim 1, wherein each of the defined state transition histories is one or a plurality of serial combinations of state/firing condition pairs as pairs, in each of which a defined state defining a state of the computer is associated with a defined firing condition defining a firing condition for making a transition from the defined state of the computer to the next defined state, the state transition function is a function for making a transition from a real state of the computer to the next defined state when the real state as an actual state of the computer matches the defined state and the defined firing condition associated with the matched defined state is satisfied, and the action execution function is a function for selecting, upon execution of the real access to the real resource, a defined action associated with a defined state transition history when there is the defined state transition history matching the real state transition history from among one or the plurality of defined actions, each defined to be executable when a transition is made from a defined state matching the real state to the next defined state, on condition that the defined firing condition associated with the defined state matching the real state of the computer is satisfied, to execute the defined action selected.

3. The resource protection program according to claim 1, wherein the preparatory function is a function for preparing one or a plurality of alternative defined actions predefined and associated with the plurality of defined state transition histories, wherein each of the alternative defined actions defines a process for controlling predetermined access to a predetermined resource so that the alternative defined action can be executed when a transition is made from a defined state of the computer to the next defined state, and when there is no defined state transition history matching the real state transition history, the action execution function is a function for selecting, upon execution of the real access to the real resource, an alternative defined action defined to be executable when the transition is made from the defined state matching the real state of the computer to the next defined state.

4. The resource protection program according to claim 1, wherein the preparatory function is a function for preparing a plurality of defined external states associated with the plurality of defined actions, wherein each of the defined external states defines an external state as another state that is not defined in the defined state transition histories of the computer, and a real external state is an actual external state as another state that is not defined in the defined state transition histories of the computer, and the action execution function is a function for selecting, upon execution of the real access to the real resource, a defined action associated with a defined external state when there is the defined external state matching the real external state from among one or the plurality of defined actions, each defined to be executable when a transition is made from a defined state matching a real state of the computer to a next defined state, to execute the defined action selected.

5. The resource protection program according to claim 1, wherein each of the defined state transition histories is one or a plurality of serial combinations of state/firing condition pairs as pairs, in each of which a defined state defining a state of the computer is associated with a defined firing condition defining a firing condition for making a transition from the defined state of the computer to a next defined state, the preparatory function is a function for associating the plurality of defined firing conditions with the plurality of defined external states, wherein each of the defined external states defines an external state as another state that is not defined in the defined state transition histories of the computer, and when a real state as an actual state of the computer matches a defined state, the state transition function is a function for making a transition from the real state of the computer to the next defined state on condition that a defined firing condition associated with the matched defined state and associated with a defined external state matching a real external state as an actual external state is satisfied.

6. The resource protection program according to claim 1, wherein each of the defined state transition histories is one or a plurality of serial combinations of state/firing condition pairs as pairs, in each of which a defined state defining a state of the computer is associated with a defined firing condition defining a firing condition for making a transition from the defined state of the computer to a next defined state, the preparatory function is a function for associating the plurality of defined firing conditions with the plurality of defined state transition histories, and when a real state as an actual state of the computer matches a defined state, the state transition function is a function for making the transition from the real state of the computer to a next defined state on condition that a defined firing condition associated with the matched defined state and associated with a defined state transition history when there is the defined state transition history matching a real state transition history as an actual state transition history is satisfied.

7. A resource protection program for protecting resources to be processed on a computer comprising a memory with the program stored therein, the program causing the computer to implement:

a preparatory function as a function for preparing a plurality of defined state transition histories and a plurality of defined actions, both of which are predefined and associated with each other, preparing a plurality of weighting values associated with the plurality of defined state transition histories, and associating a plurality of final state values with the plurality of defined actions, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to a next defined state, each of the final state values is a value of a final state function using a weighting value as a variable, and a real state transition history is a history of actual state transitions in the computer upon execution of real access as actual access to a real resource as an actual resource;

a state transition function for making a transition of an actual state of the computer according to a defined state transition history;

a final state value calculating function as a function for calculating the final state function using a determined weighting value as a variable to obtain a final state value, wherein the determined weighting value is a weighting value associated with a defined state transition history matching the real state transition history; and an action execution function for selecting, upon execution of the real access to the real resource, a defined action associated with the final state value from among one or the plurality of defined actions, each defined to be executable when the transition is made from a defined state matching a real state of the computer to a next defined state, to execute the defined action selected.

8. The resource protection program according to claim 7, wherein the preparatory function is a function for preparing external state weighting values associated with the plurality of defined external states, and associating one or a plurality of defined state transitions in the computer with one or the plurality of defined external states, wherein each of the defined external states defines an external state as another state that is not defined in the defined state transition histories of the computer, and the final state value is a value of a final state function using the weighting value and the external state weighting values as variables, and the final state value calculating function is a function for calculating the final state function using a determined weighting value and determined external state weighting values as variables to obtain the final state value, wherein the determined weighting value is a weighting value associated with a defined state transition history matching the real state transition history, and the determined external state weighting values are external state weighting values associated with the defined external states associated with defined state transitions matching actual state transitions leading up to the real state of the computer.

9. The resource protection program according to claim 7, wherein
- each of the defined state transition histories is one or a plurality of serial combinations of state/firing condition pairs as pairs, in each of which a defined state defining a state of the computer is associated with a defined firing condition defining a firing condition for making a transition from the defined state of the computer to the next defined state,
- the state transition function is a function for making a transition from a real state of the computer to the next defined state when the real state as an actual state of the computer matches a defined state and the defined firing condition associated with the matched defined state is satisfied, and
- the action execution function is a function for selecting, upon execution of the real access to the real resource, a defined action associated with the final state value from among one or the plurality of defined actions, each defined to be executable when a transition is made from a defined state matching the real state to a next defined state, on condition that the defined firing condition associated with the defined state matching the real state of the computer is satisfied, to execute the defined action selected.

10. The resource protection program according to claim 7, wherein
- the preparatory function is a function for preparing one or a plurality of alternative defined actions predefined and associated with the plurality of defined state transition histories, wherein each of the alternative defined actions defines a process for controlling predetermined access to a predetermined resource so that the alternative defined action can be executed when a transition is made from a defined state of the computer to the next state, and
- when there is no defined action associated with the final state value, the action execution function is a function for executing, upon execution of the real access to the real resource, an alternative defined action defined to be executable when the transition is made from the defined state matching the real state of the computer to the next defined state.

11. The resource protection program according to claim 7, wherein
- the preparatory function is a function for preparing a plurality of defined external states associated with the plurality of defined actions, wherein each of the defined external states defines an external state as another state that is not defined in the defined state transition histories of the computer, and a real external state is an actual external state as another state that is not defined in the defined state transition histories of the computer, and
- the action execution function is a function for selecting, upon execution of the real access to the real resource, a defined action associated with a defined external state when there is the defined external state matching the real external state from among one or the plurality of defined actions, each defined to be executable when a transition is made from a defined state matching a real state of the computer to a next defined state, to execute the defined action selected.

12. The resource protection program according to claim 7, wherein
- each of the defined state transition histories is one or a plurality of serial combinations of state/firing condition pairs as pairs, in each of which a defined state defining a state of the computer is associated with a defined firing condition defining a firing condition for making a transition from the defined state of the computer to a next defined state,
- the preparatory function is a function for associating the plurality of defined firing conditions with the plurality of defined external states, wherein each of the defined external states defines an external state as another state that is not defined in the defined state transition histories of the computer, and
- when a real state as an actual state of the computer matches a defined state, the state transition function is a function for making a transition from the real state of the computer to the next defined state on condition that a defined firing condition associated with the matched defined state and associated with a defined external state matching a real external state as an actual external state is satisfied.

13. The resource protection program according to claim 7, wherein
- each of the defined state transition histories is one or a plurality of serial combinations of state/firing condition pairs as pairs, in each of which a defined state defining a state of the computer is associated with a defined firing condition defining a firing condition for making a transition from the defined state of the computer to a next defined state,
- the preparatory function is a function for associating the plurality of defined firing conditions with the plurality of defined state transition histories, and
- when a real state as an actual state of the computer matches a defined state, the state transition function makes the transition from the real state of the computer to a next defined state on condition that a defined firing condition associated with the matched defined state and associated with a defined state transition history when there is the defined state transition history matching a real state transition history as an actual state transition history is satisfied.

14. A resource protection program for protecting resources to be processed on a computer comprising a memory with the program stored therein, the program causing the computer to implement:
- a preparatory function as a function for preparing a plurality of defined state transition histories and a plurality of defined actions, both of which are predefined and associated with each other, preparing a plurality of individual weighting values associated with a plurality of defined state transitions in the computer, and associating a plurality of final state values with the plurality of defined actions, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to a next defined state, each of the final state values is a value of a final state function using, as variables, a plurality of individual weighting values associated with a plurality of defined state transitions matching a plurality of state transitions leading up to a predetermined state, and a real state transition history is a history of actual state transitions in the computer upon execution of real access as actual access to a real resource as an actual resource;

a state transition function for making a transition of an actual state of the computer according to a defined state transition history;

a final state value calculating function as a function for calculating the final state function using a plurality of determined individual weighting values as variables to obtain a final state value, wherein the plurality of determined individual weighting values are a plurality of individual weighting values associated with a plurality of defined state transitions matching a plurality of actual state transitions leading up to a real state of the computer upon execution of the real access to the real resource; and an action execution function for selecting, upon execution of the real access to the real resource, a defined action associated with the final state value from among one or the plurality of defined actions, each defined to be executable when the transition is made from a defined state matching the real state of the computer to a next defined state, to execute the defined action selected.

15. The resource protection program according to claim 14, wherein the preparatory function is a function for preparing external state weighting values associated with the plurality of defined external states, and associating one or a plurality of defined state transitions in the computer with one or the plurality of defined external states, wherein each of the defined external states defines an external state as another state that is not defined in the defined state transition histories of the computer, and the final state value is a value of a final state function using, as variables, one or a plurality of determined individual weighting values and determined external state weighting values, and the final state value calculating function is a function for calculating the final state function using, as the variables, the one or the plurality of determined individual weighting values and the determined external state weighting values to obtain the final state value, wherein the plurality of determined individual weighting values are a plurality of individual weighting values associated with a plurality of defined state transitions matching a plurality of actual state transitions leading up to a real state of the computer upon execution of the real access to the real resource, and the determined external state weighting values are external state weighting values associated with the defined external states associated with defined state transitions matching actual state transitions leading up to the real state of the computer.

16. The resource protection program according to claim 14, wherein each of the defined state transition histories is one or a plurality of serial combinations of state/firing condition pairs as pairs, in each of which a defined state defining a state of the computer is associated with a defined firing condition defining a firing condition for making a transition from the defined state of the computer to the next defined state, the state transition function is a function for making a transition from a real state of the computer to the next defined state when the real state as an actual state of the computer matches the defined state and the defined firing condition associated with the matched defined state is satisfied, and the action execution function selects, upon execution of the real access to the real resource, a defined action associated with the final state value from among one or the plurality of defined actions, each defined to be executable when a transition is made from a defined state matching the real state to a next defined state, on condition that the defined firing condition associated with the defined state matching the real state of the computer is satisfied, to execute the defined action selected.

17. The resource protection program according to claim 14, wherein the preparatory function is a function for preparing one or a plurality of alternative defined actions predefined and associated with the plurality of defined state transition histories, wherein each of the alternative defined actions defines a process for controlling predetermined access to a predetermined resource so that the alternative defined action can be executed when a transition is made from a defined state of the computer to the next state, and when there is no defined action associated with the final state value, the action execution function is a function for executing, upon execution of the real access to the real resource, an alternative defined action defined to be executable when the transition is made from the defined state matching the real state of the computer to the next defined state.

18. The resource protection program according to claim 14, wherein the preparatory function is a function for preparing a plurality of defined external states associated with the plurality of defined actions, wherein each of the defined external states defines an external state as another state that is not defined in the defined state transition histories of the computer, and a real external state is an actual external state as another state that is not defined in the defined state transition histories of the computer, and the action execution function is a function for selecting, upon execution of the real access to the real resource, a defined action associated with a defined external state when there is the defined external state matching the real external state from among one or the plurality of defined actions, each defined to be executable when a transition is made from a defined state matching a real state of the computer to a next defined state, to execute the defined action selected.

19. The resource protection program according to claim 14, wherein each of the defined state transition histories is one or a plurality of serial combinations of state/firing condition pairs as pairs, in each of which a defined state defining a state of the computer is associated with a defined firing condition defining a firing condition for making a transition from the defined state of the computer to a next defined state, the preparatory function is a function for associating the plurality of defined firing conditions with the plurality of defined external states, wherein each of the defined external states defines an external state as another state that is not defined in the defined state transition histories of the computer, and when a real state as an actual state of the computer matches a defined state, the state transition function is a function for making a transition from the real state of the computer to the next defined state on condition that a defined firing condition associated with the matched defined state and associated with a defined external state matching a real external state as an actual external state is satisfied.

20. The resource protection program according to claim 14, wherein
each of the defined state transition histories is one or a plurality of serial combinations of state/firing condition pairs as pairs, in each of which a defined state defining a state of the computer is associated with a defined firing condition defining a firing condition for making a transition from the defined state of the computer to a next defined state,
the preparatory function is a function for associating the plurality of defined firing conditions with the plurality of defined state transition histories, and
when a real state as an actual state of the computer matches a defined state, the state transition function is a function for making the transition from the real state of the computer to a next defined state on condition that a defined firing condition associated with the matched defined state and associated with a defined state transition history when there is the defined state transition history matching a real state transition history as an actual state transition history is satisfied.

21. An apparatus for protecting resources to be processed on a computer, the apparatus comprising:
a central processing unit (CPU) coupled to a memory that includes instructions that, when executed by the CPU, causes the apparatus to perform steps of:
preparing a plurality of defined state transition histories and a plurality of defined actions, both of which are predefined and associated with each other, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to a next defined state, and a real state transition history is a history of actual state transitions in the computer upon execution of real access as actual access to a real resource as an actual resource;
making a transition of an actual state of the computer according to a defined state transition history; and
selecting, upon execution of the real access to the real resource, a defined action associated with a defined state transition history when there is the defined state transition history matching the real state transition history from among one or the plurality of defined actions, each defined to be executable when the transition is made from a defined state matching a real state of the computer to a next defined state, to execute the defined action selected.

22. An apparatus for protecting resources to be processed on a computer, the apparatus comprising:
a central processing unit (CPU) coupled to a memory that includes instructions that, when executed by the CPU, causes the apparatus to perform steps of:
preparing a plurality of defined state transition histories and a plurality of defined actions, both of which are predefined and associated with each other, preparing a plurality of weighting values associated with the plurality of defined state transition histories, and associating a plurality of final state values with the plurality of defined actions, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to a next defined state, each of the final state values is a value of a final state function using a weighting value as a variable, and a real state transition history is a history of actual state transitions in the computer upon execution of real access as actual access to a real resource as an actual resource;
making a transition of an actual state of the computer according to a defined state transition history;
calculating the final state function using a determined weighting value as a variable to obtain a final state value, wherein the determined weighting value is a weighting value associated with a defined state transition history matching the real state transition history; and
selecting, upon execution of the real access to the real resource, a defined action associated with the final state value from among one or the plurality of defined actions, each defined to be executable when the transition is made from a defined state matching a real state of the computer to a next defined state, to execute the defined action selected.

23. An apparatus for protecting resources to be processed on a computer, the apparatus comprising:
a central processing unit (CPU) coupled to a memory that includes instructions that, when executed by the CPU, causes the apparatus to perform steps of:
preparing a plurality of defined state transition histories and a plurality of defined actions, both of which are predefined and associated with each other, preparing a plurality of individual weighting values associated with a plurality of defined state transitions in the computer, and associating a plurality of final state values with the plurality of defined actions, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to a next defined state, each of the final state values is a value of a final state function using, as variables, a plurality of individual weighting values associated with a plurality of defined state transitions matching a plurality of state transitions leading up to a predetermined state, and a real state transition history is a history of actual state transitions in the computer upon execution of real access as actual access to a real resource as an actual resource;
making a transition of an actual state of the computer according to a defined state transition history;
calculating the final state function using a plurality of determined individual weighting values as variables to obtain a final state value, wherein the plurality of determined individual weighting values are a plurality of individual weighting values associated with a plurality of defined state transitions matching a plurality of actual state transitions leading up to a real state of the computer upon execution of the real access to the real resource; and
selecting, upon execution of the real access to the real resource, a defined action associated with the final state value from among one or the plurality of defined actions, each defined to be executable when the transition is made from a defined state matching the real state of the computer to a next defined state, to execute the defined action selected.

24. A resource protection method for protecting resources to be processed on a computer, the method comprising steps executed by the computer of:
- a preparation step as a step of preparing a plurality of defined state transition histories and a plurality of defined actions, both of which are predefined and associated with each other, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to a next defined state, and a real state transition history is a history of actual state transitions in the computer upon execution of real access as actual access to a real resource as an actual resource;
- a state transition step of making a transition of an actual state of the computer according to a defined state transition history; and
- an action execution step of selecting, upon execution of the real access to the real resource, a defined action associated with a defined state transition history when there is the defined state transition history matching the real state transition history from among one or the plurality of defined actions, each defined to be executable when the transition is made from a defined state matching a real state of the computer to a next defined state, to execute the defined action selected.

25. A resource protection method for protecting resources to be processed on a computer, the method comprising steps executed by the computer of:
- a preparation step as a step of preparing a plurality of defined state transition histories and a plurality of defined actions, both of which are predefined and associated with each other, preparing a plurality of weighting values associated with the plurality of defined state transition histories, and associating a plurality of final state values with the plurality of defined actions, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to a next defined state, each of the final state values is a value of a final state function using a weighting value as a variable, and a real state transition history is a history of actual state transitions in the computer upon execution of real access as actual access to a real resource as an actual resource;
- a state transition step of making a transition of an actual state of the computer according to a defined state transition history;
- a final state value calculating step as a step of calculating the final state function using a determined weighting value as a variable to obtain a final state value, wherein the determined weighting value is a weighting value associated with a defined state transition history matching the real state transition history; and
- an action execution step of selecting, upon execution of the real access to the real resource, a defined action associated with the final state value from among one or the plurality of defined actions, each defined to be executable when the transition is made from a defined state matching a real state of the computer to a next defined state, to execute the defined action selected.

26. A resource protection method for protecting resources to be processed on a computer, the method comprising steps executed by the computer of:
- a preparation step as a step of preparing a plurality of defined state transition histories and a plurality of defined actions, both of which are predefined and associated with each other, preparing a plurality of individual weighting values associated with a plurality of defined state transitions in the computer, and associating a plurality of final state values with the plurality of defined actions, wherein each of the defined state transition histories defines a state transition history as a history of state transitions in the computer upon execution of predetermined access to a predetermined resource, each of the defined actions defines a process for controlling predetermined access to a predetermined resource so that the defined action can be executed upon transition from a defined state defining a state of the computer to a next defined state, each of the final state values is a value of a final state function using, as variables, a plurality of individual weighting values associated with a plurality of defined state transitions matching a plurality of state transitions leading up to a predetermined state, and a real state transition history is a history of actual state transitions in the computer upon execution of real access as actual access to a real resource as an actual resource;
- a state transition step of making a transition of an actual state of the computer according to a defined state transition history;
- a final state value calculating step as a step of calculating the final state function using a plurality of determined individual weighting values as variables to obtain a final state value, wherein the plurality of determined individual weighting values are a plurality of individual weighting values associated with a plurality of defined state transitions matching a plurality of actual state transitions leading up to a real state of the computer upon execution of the real access to the real resource; and
- an action execution step of selecting, upon execution of the real access to the real resource, a defined action associated with the final state value from among one or the plurality of defined actions, each defined to be executable when the transition is made from a defined state matching the real state of the computer to a next defined state, to execute the defined action selected.

* * * * *